US007295415B2

(12) United States Patent
Huang et al.

(10) Patent No.: US 7,295,415 B2
(45) Date of Patent: Nov. 13, 2007

(54) CIRCUITS FOR CIRCUIT INTERRUPTING DEVICES HAVING AUTOMATIC END OF LIFE TESTING FUNCTION

(75) Inventors: Huadao Huang, c/o Shanghai Meihao Electric Inc. No. 58 Shahe Road Jiangqiao Town, Jiading Borough, Shanghai (CN); Lu Huayang, Shanghai (CN)

(73) Assignee: Huadao Huang (CN)

( * ) Notice: Subject to any disclaimer, the term of this patent is extended or adjusted under 35 U.S.C. 154(b) by 0 days.

(21) Appl. No.: 11/524,287

(22) Filed: Sep. 21, 2006

(65) Prior Publication Data

US 2007/0014068 A1 Jan. 18, 2007

Related U.S. Application Data

(63) Continuation-in-part of application No. 11/437,811, filed on May 22, 2006, which is a continuation-in-part of application No. 11/362,037, filed on Feb. 27, 2006, now Pat. No. 7,195,500.

(60) Provisional application No. 60/656,090, filed on Feb. 25, 2005.

(51) Int. Cl.
*H02H 7/00* (2006.01)

(52) U.S. Cl. ........................................ 361/107; 361/115

(58) Field of Classification Search ................ 361/107, 361/115, 42, 535, 44; 335/18
See application file for complete search history.

(56) References Cited

U.S. PATENT DOCUMENTS

| | | | |
|---|---|---|---|
| 4,386,338 | A | 5/1983 | Doyle et al. |
| 4,518,945 | A | 5/1985 | Doyle et al. |
| 4,595,894 | A | 6/1986 | Doyle et al. |
| 5,202,662 | A | 4/1993 | Bienwald et al. |
| 5,654,857 | A | 8/1997 | Gershen |
| 5,680,287 | A | 10/1997 | Gernhard et al. |
| 5,963,408 | A | 10/1999 | Neiger et al. |
| 6,040,967 | A | 3/2000 | DiSalvo |
| 6,052,265 | A | 4/2000 | Zaretsky et al. |
| 6,111,733 | A | 8/2000 | Neiger et al. |
| 6,226,161 | B1 | 5/2001 | Neiger et al. |
| 6,246,558 | B1 | 6/2001 | DiSalvo et al. |
| 6,252,407 | B1 | 6/2001 | Gershen |

(Continued)

*Primary Examiner*—Michael C. Zarroli
(74) *Attorney, Agent, or Firm*—Fei-Fei Chao; Andrews Kurth, LLP

(57) ABSTRACT

The present invention provides a set of circuits which is capable of performing an automatic check on main components of a circuit interrupting device when the circuit interrupting device is properly powered and the device is at a tripped state to determine whether these main components function normally. The results of the automatic check can be detected by depressing a reset button in the circuit interrupting device. If the reset button can be depressed, the main components function normally. Alternatively, the results can be automatically displayed by a showing on the face lid of the circuit interrupting device of either a green light, which means that the main components function normally, or a red or yellow light or no light, which means that at least one of the main components in the circuit interrupting device does not function properly. The present invention also provides an end-of-service-life detection integrated circuit chip capable of receiving and transmitting an automatic check signal and determining whether or not the circuit interrupting device can be reset. The preferred circuit interrupting device is a ground fault circuit interrupter (GFCI).

30 Claims, 14 Drawing Sheets

U.S. PATENT DOCUMENTS

| | | | |
|---|---|---|---|
| 6,282,070 | B1 | 8/2001 | Ziegler et al. |
| 6,288,882 | B1 | 9/2001 | DiSalvo et al. |
| 6,309,248 | B1 | 10/2001 | King |
| 6,381,112 | B1 | 4/2002 | DiSalvo |
| 6,437,953 | B2 | 8/2002 | DiSalvo et al. |
| 6,469,881 | B2 | 10/2002 | Gershen et al. |
| 6,580,344 | B2 | 6/2003 | Li |
| 6,671,145 | B2 | 12/2003 | Germain et al. |
| 6,963,260 | B2 | 11/2005 | Germain et al. |
| 7,009,473 | B2 | 3/2006 | Zhang et al. |
| 7,019,952 | B2 | 3/2006 | Huang et al. |
| 7,049,910 | B2 | 5/2006 | Campolo et al. |
| 7,049,911 | B2 | 5/2006 | Germain et al. |

CIRCUITS FOR CIRCUIT INTERRUPTING DEVICES HAVING AUTOMATIC END OF LIFE TESTING FUNCTION

RELATED APPLICATIONS

The present application is a Continuation-In-Part (CIP) of U.S. patent application Ser. No. 11/437,811, filed on May 22, 2006, which is a CIP of U.S. patent application Ser. No. 11/362,037, filed on Feb. 27, 2006 now U.S. Pat. No. 7,195,500, which claims the priority of U.S. Provisional Patent Application Ser. No. 60/656,090, filed on Feb. 25, 2005, which are herein incorporated by reference.

FIELD OF THE INVENTION

The present invention relates to a set of circuits capable of performing an automatic check on main components in a circuit interrupting device when the device is powered on and at a tripped state to determine whether these main components function normally. The results of the automatic check can be detected by depressing a reset button in the circuit interrupting device. If the reset button can be depressed, the main components function normally. Alternatively, the results can be automatically displayed by a showing on the face lid of the circuit interrupting device of either a green light, which means that the main components function normally, or a red or yellow light or no light, which means that at least one of the main components in the circuit interrupting device does not function normally. The present invention also relates to an end-of-service-life detection integrated circuit chip, which is capable of receiving and transmitting an automatic check signal and determining whether or not the circuit interrupting device can be reset. The preferred circuit interrupting device is a ground fault circuit interrupter (GFCI).

BACKGROUND OF THE INVENTION

Circuit interrupting devices, such as ground fault circuit interrupters ("GFCIs"), arc fault circuit interrupters ("AFCIs"), and circuit breakers, have been widely used by consumers since 1970s. Nowadays, due to household safety concerns, there are needs for GFCIs with extra safety features. According to the UL standards under 934A effective Jul. 28, 2006, a GFCI is required not only to have reverse wiring protection, but also to be able to provide a user with indications to alert the user when the GFCI has reached the end of its service life and is no longer capable of providing ground fault protection. That is because for most of the GFCIs currently available on the market, when their service life ends, resetting by pressing the reset button is still possible, which gives the users a false sense of security that they are still under proper protection of the GFCI, while in fact the GFCIs' capability of sensing a ground fault and cutting off the electricity due to a ground fault has been compromised. Thus, when a ground fault occurs, the GFCI is unable to provide any protection, which can result in fatal electric shocks.

The invention to be described in the following sections is a circuit interrupting device which contains an automatic end of life testing system capable of determining whether the major components in the circuit interrupting device function normally without any manual operation of the device when the device is powered on and at a tripped state.

SUMMARY OF THE INVENTION

The present invention provides an end-of-service-life integrated circuit chip (IC2) capable of performing an end-of-service-life test in a circuit interrupting device. The IC2 comprises (a) a flip-flop latch circuit and (b) an emitter circuit. The flip-flop latch circuit contains a first transistor and a second transistor. It is adapted to receive and transmit a status signal when the circuit interrupting device is powered on and is at a tripped state, allow the circuit interrupting device to be reset when the components in the main circuit of the circuit interrupting device function normally, and disallow the circuit interrupting device to be reset when at least one of the components in the main circuit of the circuit interrupting device does not function normally. Optionally, the first transistor and the second transistor in the flip-flop latch circuit can be replaced with a complementary-symmetry/metal-oxide semiconductor (CMOS) integrated circuit transistor compound set. The emitter circuit comprises a third transistor. It is adapted to output the status signal from the flip-flop latch circuit through the third transistor to a simulated leakage current generation circuit of the circuit interrupting device to generate a simulated leakage current to test whether the components in the main circuit of the circuit interrupting device function normally. The IC2 performs the end-of-service-life test without a need to depress a reset button in the circuit interrupting device.

The status signal is generated from a reset status checking circuit when the circuit interrupting device is powered on and a status test switch (KR1) in the reset status checking circuit is in a conductive state. The KR1 comprises a fixed frame, a first spring piece and a second spring piece. In the conductive state, the first spring piece and the second spring piece are in contact with each other. The KR1 is in the conductive state when the circuit interrupting device is at the tripped state.

The flip-flop latch circuit in the IC2 allows the circuit interrupting device to be reset when a reset confirmed signal is generated from a simulated current detection feedback circuit and sent to said flip-flop latch circuit in said IC2. The reset confirmed signal is generated when the components in the main circuit function normally. The flip-flop latch circuit transmits the reset confirmed signal to a reset confirmation circuit to allow the circuit interrupting device to be reset when the reset button in the circuit interrupting device is depressed.

The reset confirmation circuit contains a reset start switch (KR4) having a first spring piece and a second spring piece. The first spring piece is connected to a leakage current detection integrated circuit chip (IC1) in the main circuit and the second spring piece is adapted to connect to the IC2. When the reset confirmation circuit receives the reset confirmed signal from the IC2 and then the reset button is depressed, the first spring piece and the second spring piece are in a conductive state to allow reset.

The IC2 further contains an inverter circuit, which receives the reset confirmed signal from the simulated current detection feedback circuit when the components in the main circuit function normally and sends the reset confirmed signal to the flip-flop latch circuit.

The IC2 further comprises an end-of-service-life test affirmation circuit, which receives the reset confirmed signal from the flip-flop latch circuit and sends it to the reset confirmation circuit and optionally to an output status display circuit. The output status display circuit allows a normal status indicating light to be turned on. The preferred normal status indicating light is a green light-emitting diode.

The IC2 further comprises a feedback signal input circuit, a start and test input circuit; a backup start and test input circuit; and a backup power supply circuit.

When the reset button is depressed, the KR1 is converted from the conductive state into a non-conductive state when the components in the main circuit function normally, which discontinues the transmission of the status signal to the flip-flop latch circuit in the IC2, which further discontinues the output of the status signal to the simulated leakage current generation circuit so that the generation of the simulated leakage current is discontinued. In the non-conductive state, the first spring piece and the second spring piece are separated from each other.

When at least one of the components in the main circuit does not function normally, no reset confirmed signal is generated from the simulated current detection feedback circuit so that no reset confirmed signal is sent to the flip-flop latch circuit in the IC2 to allow the circuit interrupting device to reset.

Also, when at least one of the components in the main circuit does not function normally, the emitter circuit continuously sends the status signal to the simulated leakage current generation circuit which continuously generates the simulated leakage current. The simulated leakage current generation circuit comprises a failure status indicating circuit which contains a failure status indicating light. The failure status indicating light is turned on when the emitter circuit continuously sends the status signal to the simulated leakage current generation circuit. The failure status indicating light is preferred to be a red or yellow light-emitting diode.

The components of the main circuit that can be detected by the IC2 comprised a differential transformer, a leakage current detection chip (IC1), a silicon control rectifier, and a solenoid coil.

The simulated current detection feedback circuit is connected to the main circuit. When the simulated leakage current is passed through the main circuit and when the components of the main circuit function normally, the differential transformer in the main circuit detects the simulated leakage current and output an electrical imbalance signal to a leakage current detection integrated circuit chip (IC1) in the main circuit, which sends the electrical imbalance signal to a silicon controlled rectifier to turn on and supply power to a solenoid coil in a tripping device to discontinue an electricity continuity of the circuit interrupting device and to allow the reset confirmed signal to be generated in the simulated current detection feedback circuit.

The simulated leakage current is further generated by a manual switch coupled to a test button. By depressing the test button, the simulated current detection feedback circuit generates the reset confirmed signal when the components of the main circuit function normally to allow the circuit interrupting device to reset.

The present invention further provides a set of circuits in a circuit interrupting device capable of automatically performing a check on main components in the circuit interrupting device. The set of circuits comprises (a) a main circuit which comprises a differential transformer, a leakage current detection chip (IC1), a silicon controlled rectifier, and a solenoid coil; the main circuit is capable of detecting a leakage current and/or a simulated leakage current; when the leakage current or the simulated leakage current is detected, the main circuit discontinues an electrical continuity of the circuit interrupting device; (b) a reset status checking circuit which comprises a status test switch (KR1); when the KR1 is in a conductive state, the reset status checking circuit generates a status signal to be sent to an end-of-service-life integrated circuit chip (IC2); (c) an end-of-service-life detection circuit which comprises the IC2; when the main circuit is functioned properly, the IC2 receives a reset confirmed signal from a simulated current detection feedback circuit to allow the circuit interrupting device to be reset; the simulated current detection feedback circuit is adapted to connect to the main circuit and generates the reset confirmed signal when the main circuit functions properly; (d) a simulated leakage current generation circuit which comprises a leakage current simulation circuit and optionally a failure status indicating circuit; the leakage current simulation circuit recognizes a status signal from the IC2 or a signal from a manual switch coupled to a test button; when a failure status signal is received by the failure status indicating circuit, a failure status indicating light is turned on; and (e) a reset confirmation circuit which receives the reset confirmed signal from the IC2 when the main circuit functions properly; the reset confirmation circuit comprises a reset start switch (KR4) having a first spring piece and a second spring piece; the first spring piece is connected to the IC1 in the main circuit and the second spring piece is adapted to connect to the IC2; when the reset confirmation circuit receives the reset confirmed signal from the IC2 and the reset button is depressed, the first spring piece and the second spring piece are in a conductive state to allow the circuit interrupting device to be reset.

Optionally, an output status display circuit can be added to the set of circuits. The output status display circuit contains a normal status indicating light. When the main components of said circuit interrupting device function normally, the output status display circuit allows the normal status indicating light to be turned on. The preferred normal status indicating light is a green light-emitting diode.

There is also optionally a failure status indicating light added in the circuit interrupting device. The failure status indicating light is controlled by a failure status indicating circuit which is included in the simulated current generation circuit. The preferred failure status indicating light is a red or yellow light-emitting diode.

The set of circuits performs an automatic check on main components in the circuit interrupting device when the circuit interrupting device is powered on and the circuit interrupting device is at a tripped state. A press of a reset button in the circuit interrupting device is not required for the automatic check.

The automatic check tests the functions of the major components in the circuit interrupting device, which include, but are not limited to, the differential transformer, the leakage current detection integrated circuit chip (IC1), the silicon controlled rectifier (SCR), and the solenoid coil, all are in the main circuit, and the IC2. If any one of these components does not work properly, at the completion of the automatic check, the circuit interrupting device cannot be reset.

The circuit interrupting device can be a ground fault circuit interrupter (GFCI), an arc fault circuit interrupter (AFCI), an immersion detection circuit interrupter, an appliance leakage circuit interrupter, or a circuit breaker.

Finally, the present invention provides a method for performing an automatic check on the functions of the main components in a circuit interrupting device. The method includes the following steps: (1) making sure that the circuit interrupting device is properly and electrically wired and at a tripped position; and (2) monitoring a display of a green light or a red or yellow light or no light on a face lid of the circuit interrupting device. When a green light is displayed, this means that the main components in the circuit interrupting device work normally. If a red or yellow light is displayed or no light is displayed, this means that at least one of the main components in the circuit interrupting device does not work normally.

An alternative way to check the functions of the main components in the circuit interrupting device is to depress a test button in the circuit interrupting device and monitor a display of a green light or a red or yellow light or no light on a face lid of the circuit interrupting device. If a green light is displayed, the main components in the circuit interrupting device function normally. If a red or yellow light is displayed or no light is displayed, at least one of the main components in the circuit interrupting device does not function normally. Also, when the green light is displayed, a reset button can be depressed so as to reestablish an electrical continuity of the circuit interrupting device.

Yet another way to perform an automatic check on the main components in a circuit interrupting device includes the steps of: (1) making sure that said circuit interrupting device is properly electrically wired and at a tripped position; and (2) depressing a reset button of the circuit interrupting device. If the reset button can be depressed, the main components in the circuit interrupting device function normally. If the reset button cannot be depressed, at least one of the main components in the circuit interrupting device is not functioned properly. Also, after the reset button is depressed and released, a user can further monitor a display of a green light or a red or yellow light or no light on the face lid of the circuit interrupting device to ensure that the circuit interrupting device works normally. If a green light is displayed, the main components in the circuit interrupting device function normally. If a red or yellow light or no light is displayed, at least one of the main components in the circuit interrupting device does not function normally.

BRIEF DESCRIPTION OF THE DRAWINGS

The detailed description will refer to the following drawings in which like numerals refer to like elements, and in which:

FIG. 1 is an exploded view illustrating the structure of an exemplary ground fault circuit interrupter (GFCI) that automatically checks for component failure and sets up a corrective reset mechanism upon power-on;

DETAILED DESCRIPTION

The present invention describes a circuit interrupting device, which includes, but is not limited to, a ground fault circuit interrupter (GFCI), an arc fault circuit interrupter (AFCI), an immersion detection circuit interrupter, an appliance leakage circuit interrupter, or a circuit breaker. The preferred circuit interrupting device is a GFCI.

The following experimental designs and result are illustrative, but not limiting the scope of the present invention. Reasonable variations, such as those occur to reasonable artisan, can be made herein without departing from the scope of the present invention. Also, in describing the invention, specific terminology is employed for the sake of clarity. However, the invention is not intended to be limited to the specific terminology so selected. It is to be understood that each specific element includes all technical equivalents which operate in a similar manner to accomplish a similar purpose.

Figure 1:
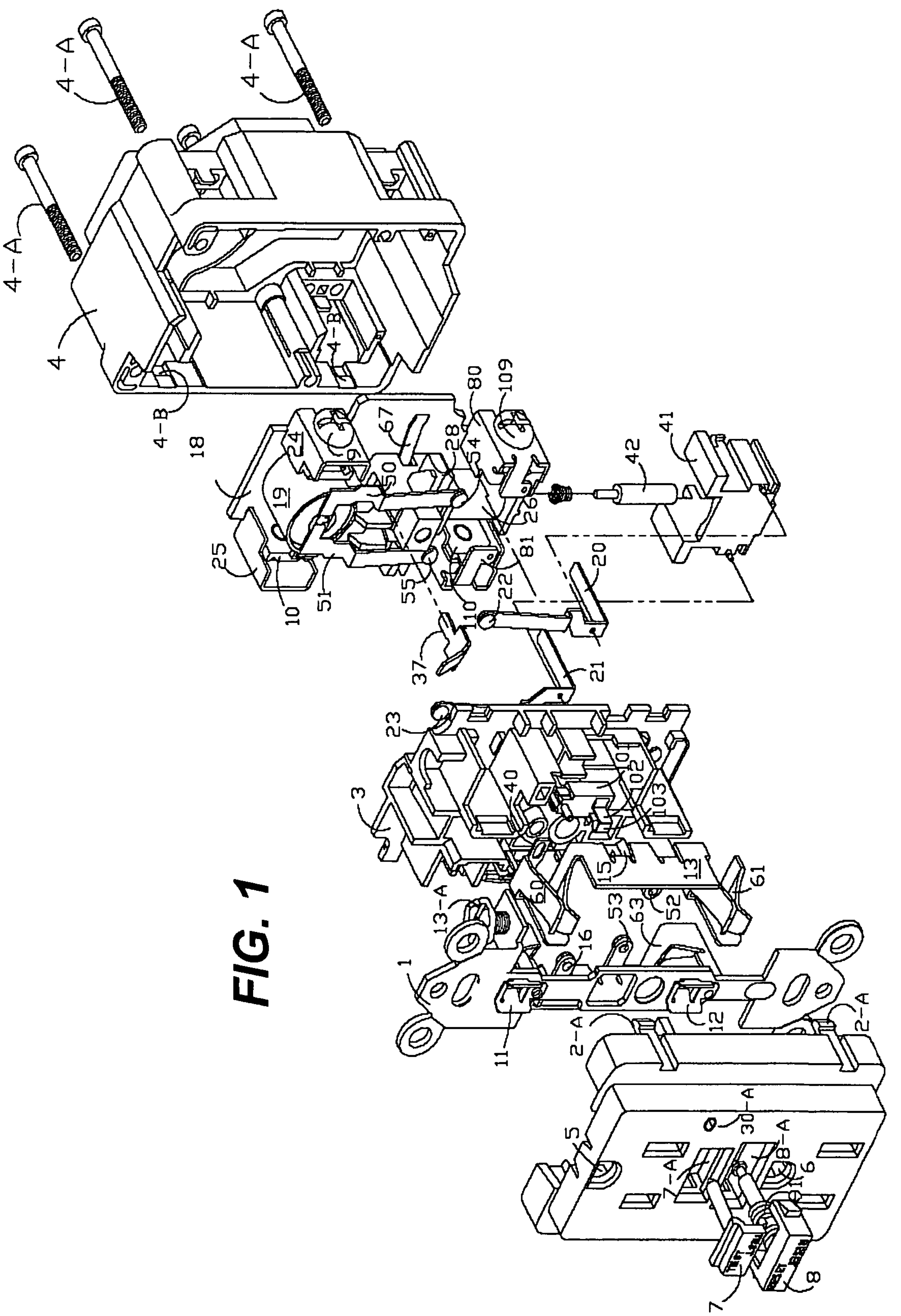
Figure 2:
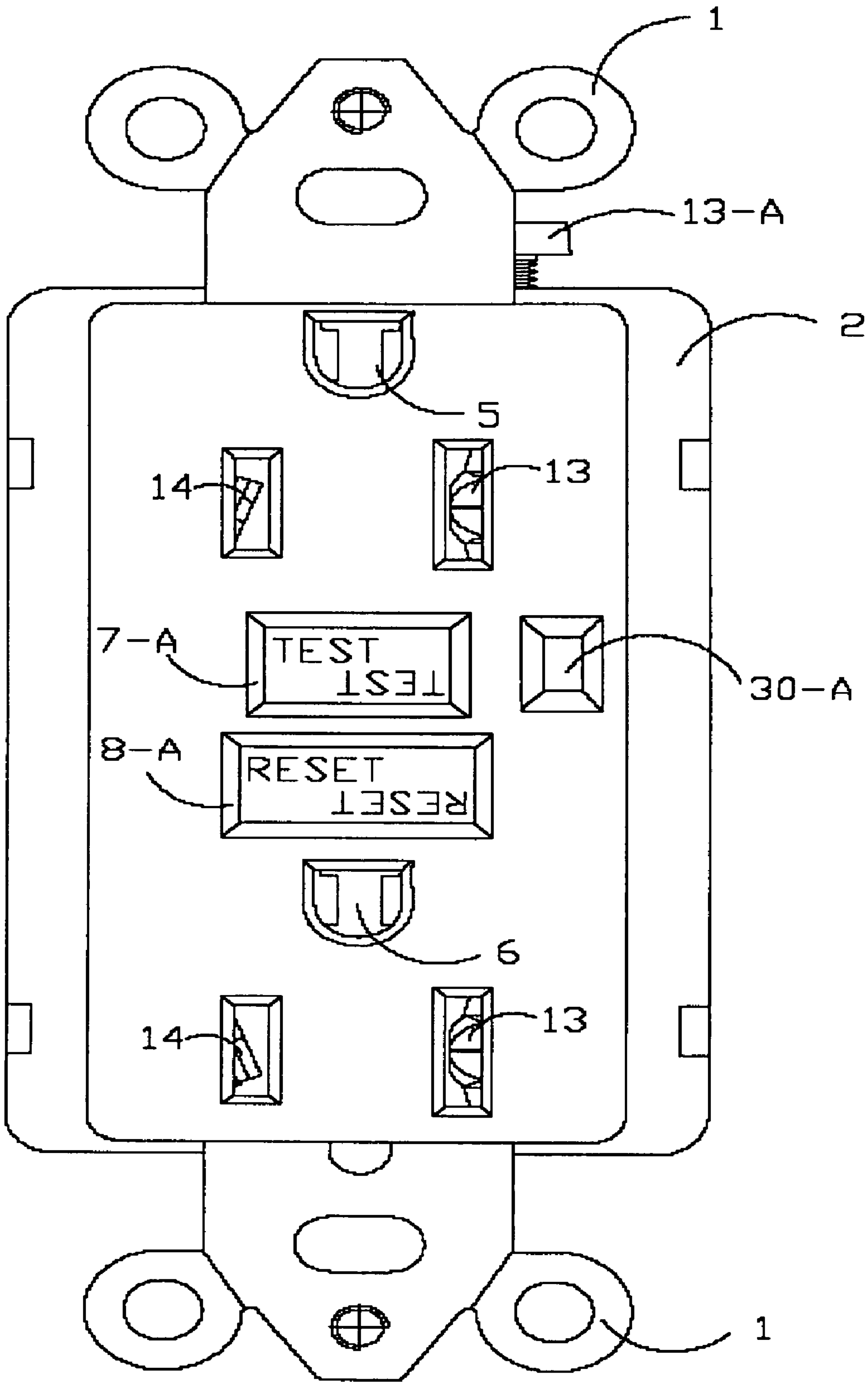
FIG. 2 is the front view of the exemplary GFCI of FIG. 1.
Figure 3:
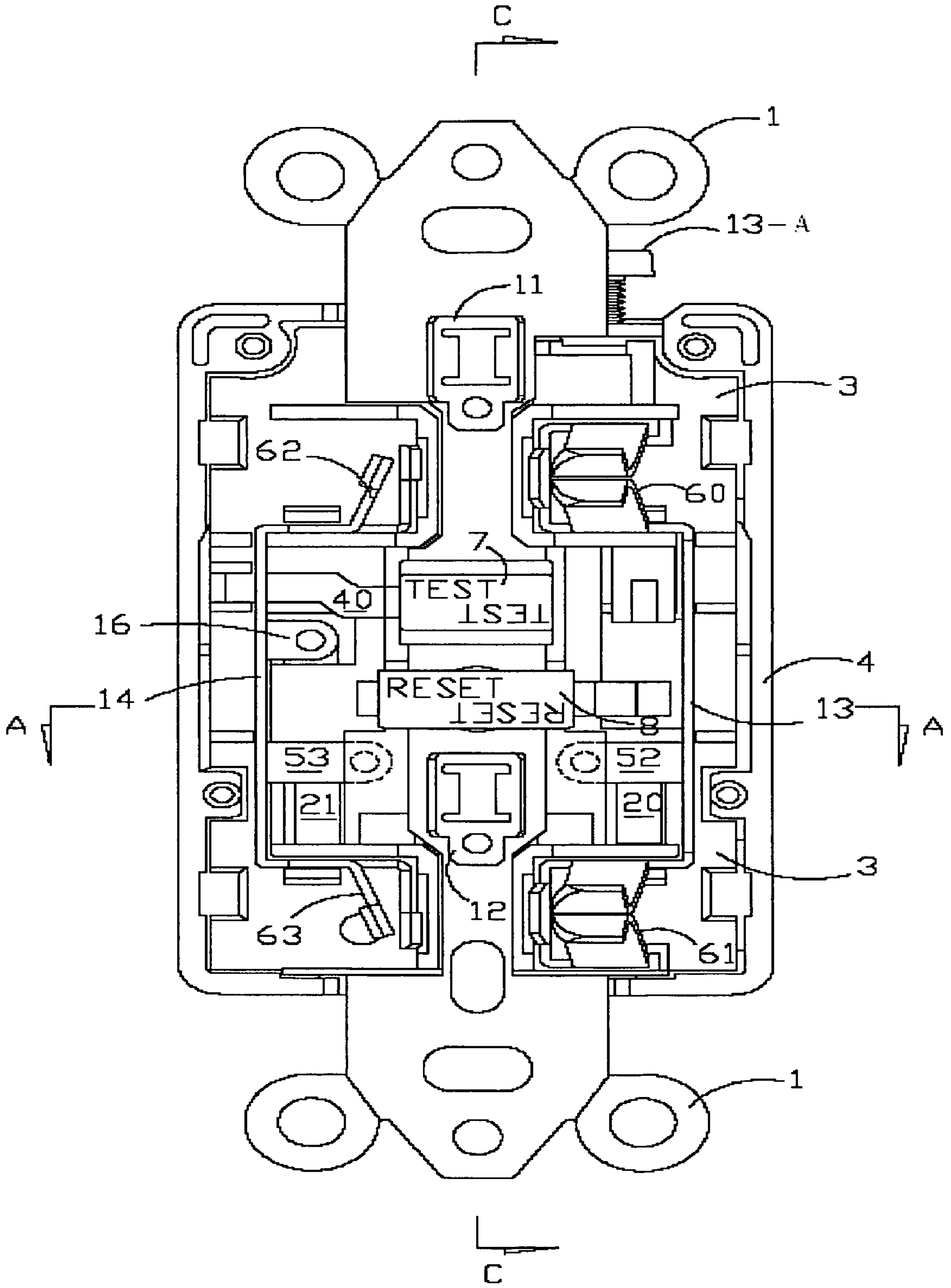
FIG. 3 is the front view of the exemplary GFCI of FIG. 1 with the upper cover removed.

FIG. 1 illustrates an exemplary circuit interrupting device, i.e., a GFCI, that automatically checks for component failure and sets up a corrective reset mechanism upon power-on. FIG. 2 is the front view of the exemplary GFCI of FIG. 1. FIG. 3 is the front view of the exemplary GFCI of FIG. 1 with the upper cover removed.

As shown in FIG. 1, the circuit interrupting device includes a housing and a circuit board 18 that is located inside the housing. The circuit board 18 is capable of detecting whether the circuit interrupting device has power output, automatically performing a test on whether the circuit interrupting device has come to the end of its service life and whether the circuit interrupting device still provides protection against any leakage current, and automatically displaying the test result.

As shown in FIG. 1, the housing of the circuit interrupting device includes a front lid 2, an insulated mid-level support 3, and a base 4. A metal mounting strap 1 is installed between the front lid 2 and the insulated mid-level support 3. The circuit board 18 is installed between the insulated mid-level support 3 and the base 4.

As shown in FIG. 1 and FIG. 2, power output sockets 5, 6, a reset button hole 8-A, a test button hole 7-A, and a status indicating light hole 30-A are located on the front lid 2. A reset button (RESET) 8 and a test button (TEST) 7 are installed in the reset button hole 8-A and the test button hole 7-A, respectively. The reset button 8 and the test button 7 penetrate through the metal mounting strap 1 and the insulated mid-level support 3 to make contact with the components on the circuit board 18. Four clamp hooks 2-A are located on the side of the front lid 2 to be used for fastening a groove 4-B on the base 4.

The metal mounting strap 1 is grounded through a grounding screw 13-A (as shown in FIGS. 1-2) and wires. Grounding pieces 11, 12 are arranged on the metal mounting strap 1 at places corresponding to the grounding holes of the power output sockets 5, 6 of the front lid 2.

As shown in FIGS. 1 and 3, a hot power output conductor 14 and a neutral power output conductor 13 are installed on the two sides of the insulated mid-level support 3. At the two ends of the power output conductors 13, 14, gripping wing pieces 60, 61, 62, 63 are arranged at the places corresponding to the hot and neutral holes of the power output sockets 5, 6 on the front lid 2. Fixed contacts 15, 52 and 16, 53 are arranged on the power output conductors 13 and 14, respectively, to form two pairs of fixed contacts "15, 16" and "52, 53."

As shown in FIG. 1, the base 4 is used to accommodate the insulated mid-level support 3 and the circuit board 18. A pair of hot and neutral power input wiring screws 9, 10 and a pair of hot and neutral power output wiring screws 109, 110 are installed symmetrically on the two sides of the base 4.

The circuit board 18, which is installed inside the housing, is capable of supplying power to or cutting off power from the power output sockets 5, 6 of the front lid 2 and the power output wiring screws 109, 110. The circuit board 18 is also capable of automatically checking for component failure, and setting up a corrective reset mechanism upon power-on.

Figure 4:
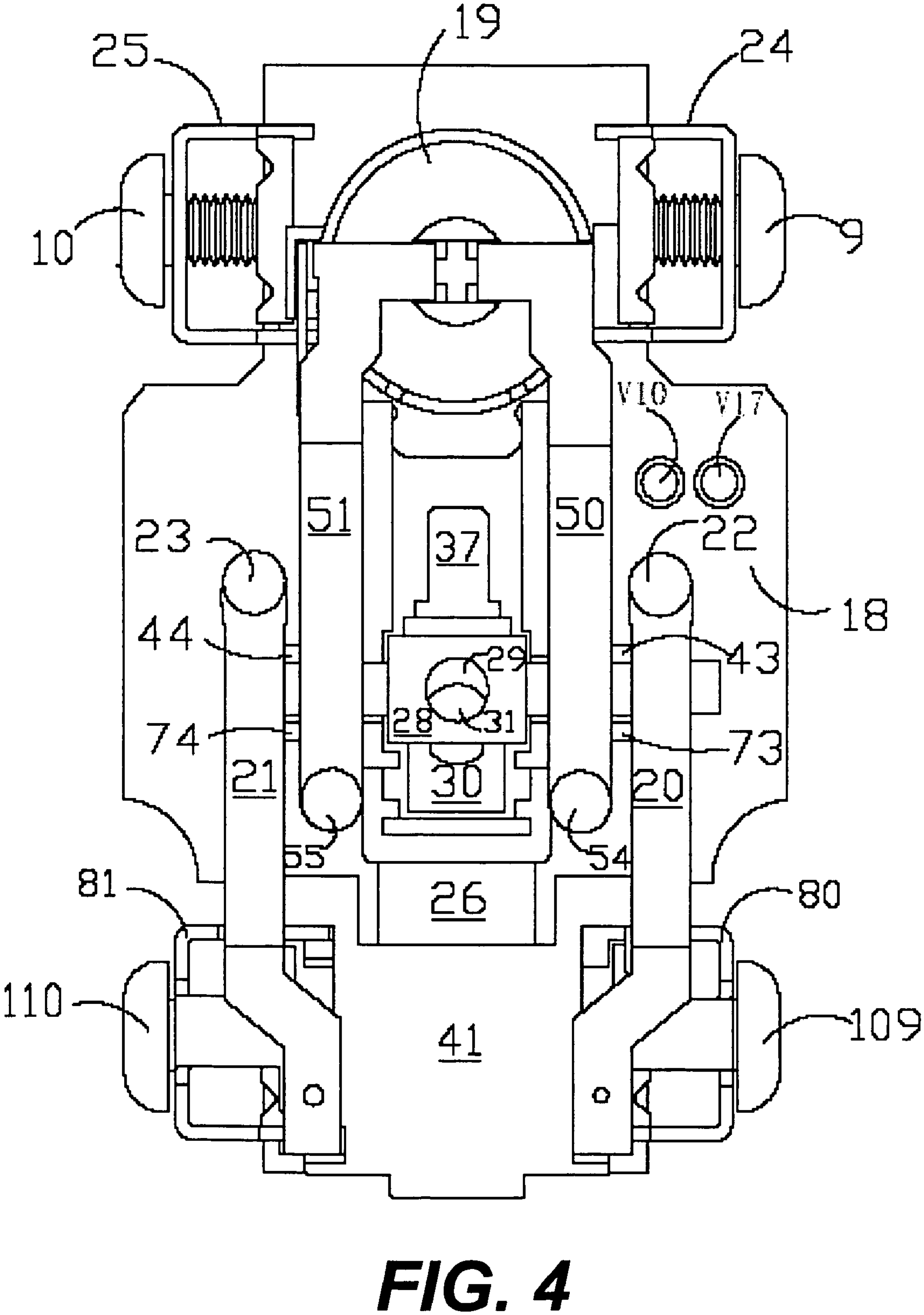
FIG. 4 illustrates exemplary relationships among the components of the circuit board of the exemplary GFCI of FIG. 1.

FIG. 4 illustrates exemplary relationships among the components of the circuit board 18. As shown in FIG. 1 and FIG. 4, a flexible neutral power input metal piece 50 and a flexible hot power input metal piece 51 are located on the circuit board 18. One end of the flexible neutral power input metal piece 50 is bent 90 degrees downwards and penetrates through a differential transformer 19. This end of the flexible neutral power input metal piece 50 is soldered onto the circuit board 18 and connected to the neutral power input wiring screw 9 through an input wiring piece 24. Similarly, one end of the flexible hot power input metal piece 51 is also bent 90 degrees downwards and penetrates through the differential transformer 19. This end of the flexible hot power input metal piece 51 is soldered onto the circuit board 18 and connected to the hot power input wiring screw 10 through an input wiring piece 25. The neutral power input wiring screw 9 is connected to a neutral wire inside a wall through a conductive wire. The hot power input wiring screw 10 is connected to a hot wire inside the wall through a conductive wire.

A movable contact 54 is located on the opposite end of the flexible neutral power input metal piece 50. A movable contact 55 is located on the opposite end of the flexible hot power input metal piece 51. The movable contacts 54, 55 respectively correspond to fixed contacts 52, 53 on the power output conductors 13, 14 located on the insulated mid-level support 3 (as shown in FIG. 3). Two flexible neutral output metal pieces 20, 21 are located above and on the sides of the circuit board 18. One end of the flexible neutral output metal piece 20 is soldered onto the circuit board 18, together with the neutral power output terminal 80, and is connected to the neutral power output wiring screw 109 located on the base 4. The movable contact 22 is located on the opposite end of the flexible neutral output metal piece 20. Similarly, one end of the flexible hot output metal piece 21 is soldered onto the circuit board 18, together with the hot power output terminal 81, and is connected to the hot power output wiring screw 110 located on the base 4. The movable contact 23 is located on the opposite end of the flexible hot output metal piece 21. These movable contacts 22, 23 respectively correspond to fixed contacts 15, 16 on the neutral power output conductor 13 and the hot power output conductor 14 (as shown in FIG. 3).

Figure 7:
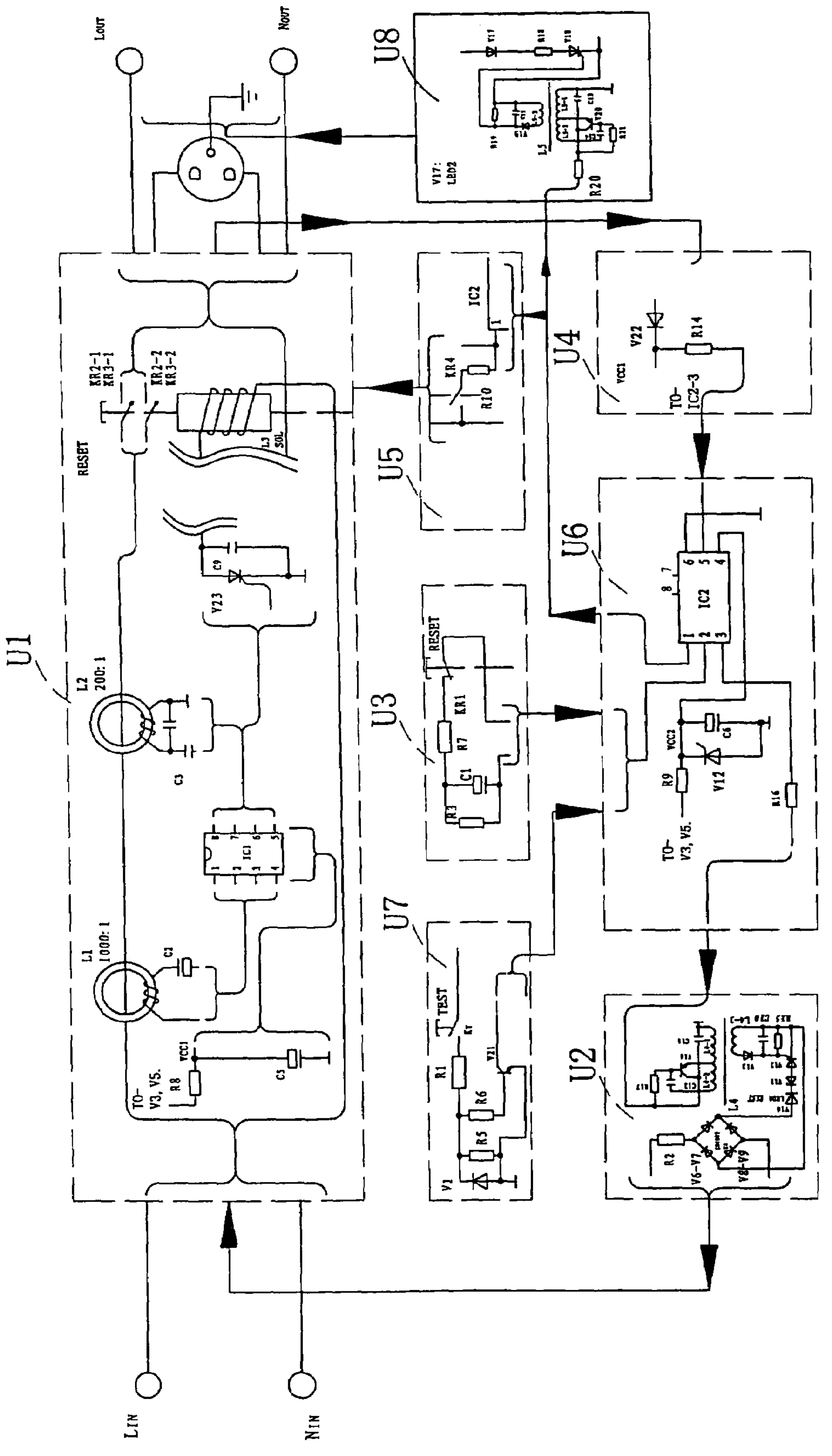
FIG. 7 illustrates a schematic view of an exemplary control circuit of a circuit interrupting device, such as a GFCI of FIG. 1.
Figure 8:
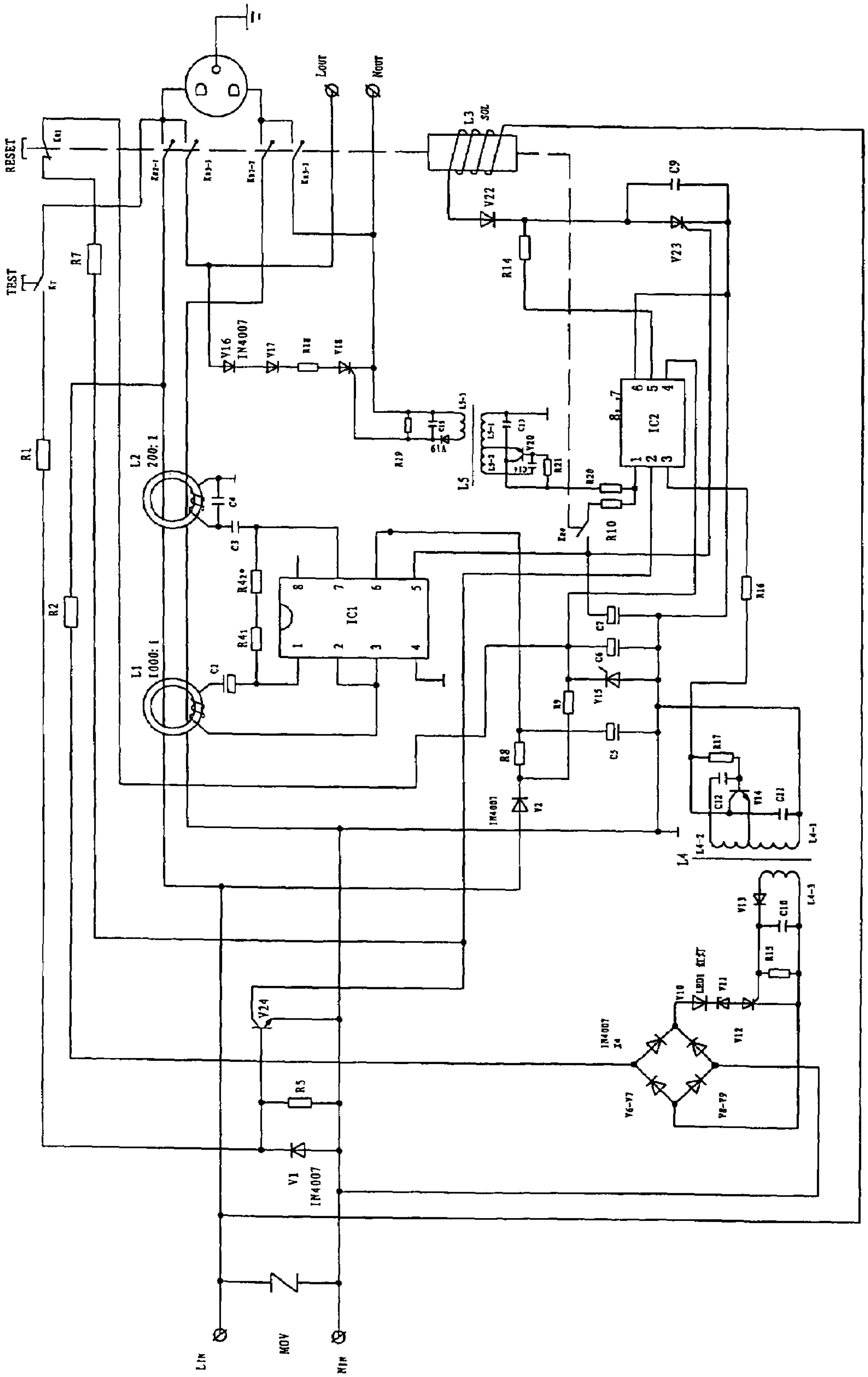
FIG. 8 illustrates a schematic view of exemplary circuit connections of the control circuit of a circuit interrupting device, such as a GFCI of FIG. 1.

As shown in FIG. 7 and FIG. 8 (to be described in detail later), the movable contact 55 on the flexible hot power input metal piece 51 and the fixed contact 53 on the hot power output conductor 14 form a pair of switches KR2-1. The movable contact 54 on the flexible neutral power input metal piece 50 and the fixed contact 52 on the neutral power output conductor 13 form a pair of switches KR2-2. The fixed contact 16 on the hot power output conductor 14 and the movable contact 23 on the flexible hot output metal piece 21 form a pair of switches KR3-1. The fixed contact 15 on the neutral power output conductor 13 and the movable contact 22 on the flexible neutral output metal piece 20 form a pair of switches KR3-2. Accordingly, the movable contacts and fixed contacts on the flexible power input metal pieces 50, 51, the power output conductors 13, 14, and the flexible output metal pieces 20, 21 form two groups of four pairs of power switches, e.g., KR2-1, KR2-2, KR3-1, KR3-2.

Figure 5A:
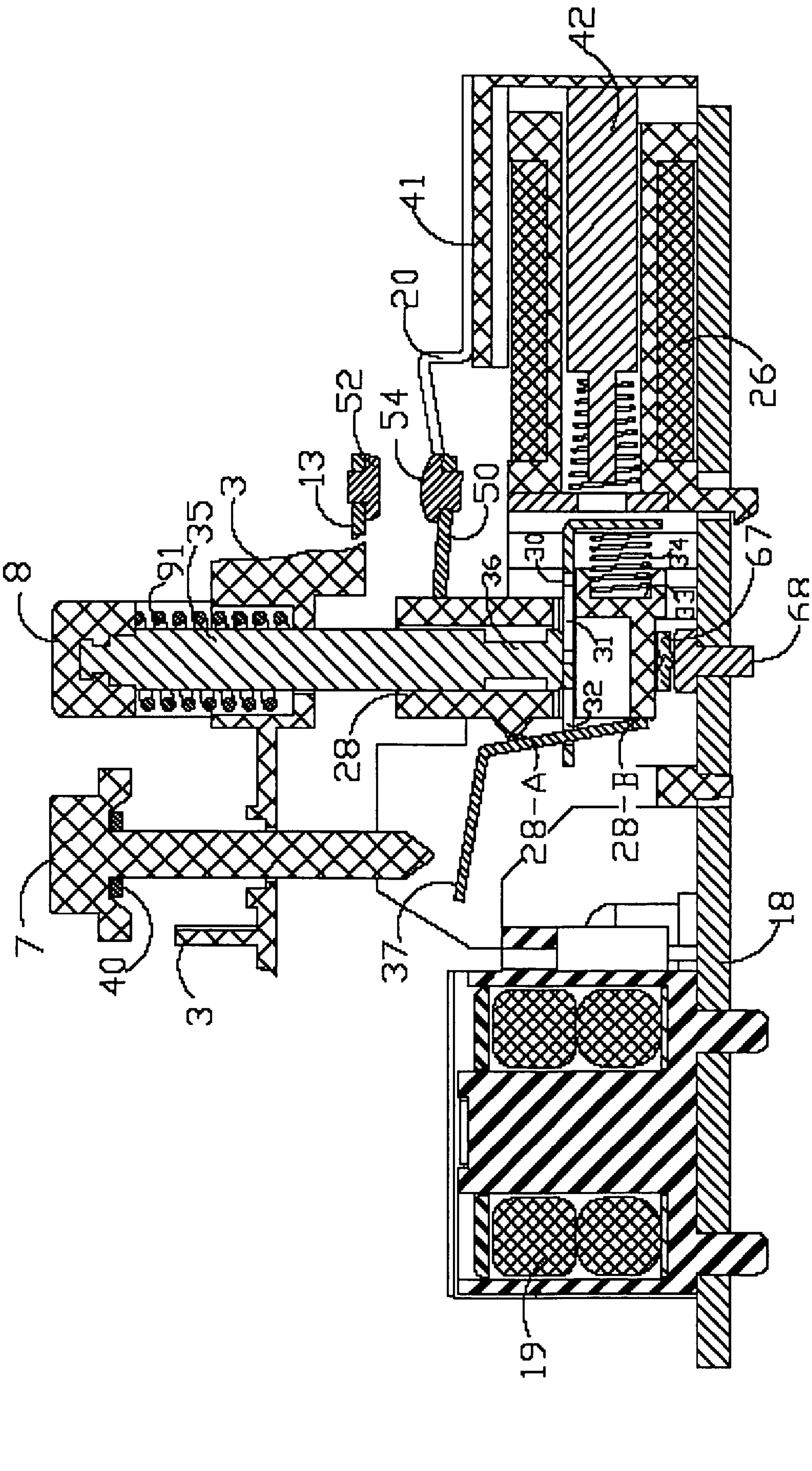
FIG. 5A is a partial cross-sectional view along the C-C line in FIG. 3, where the GFCI is illustrated to be in an initial state.
Figure 5B:
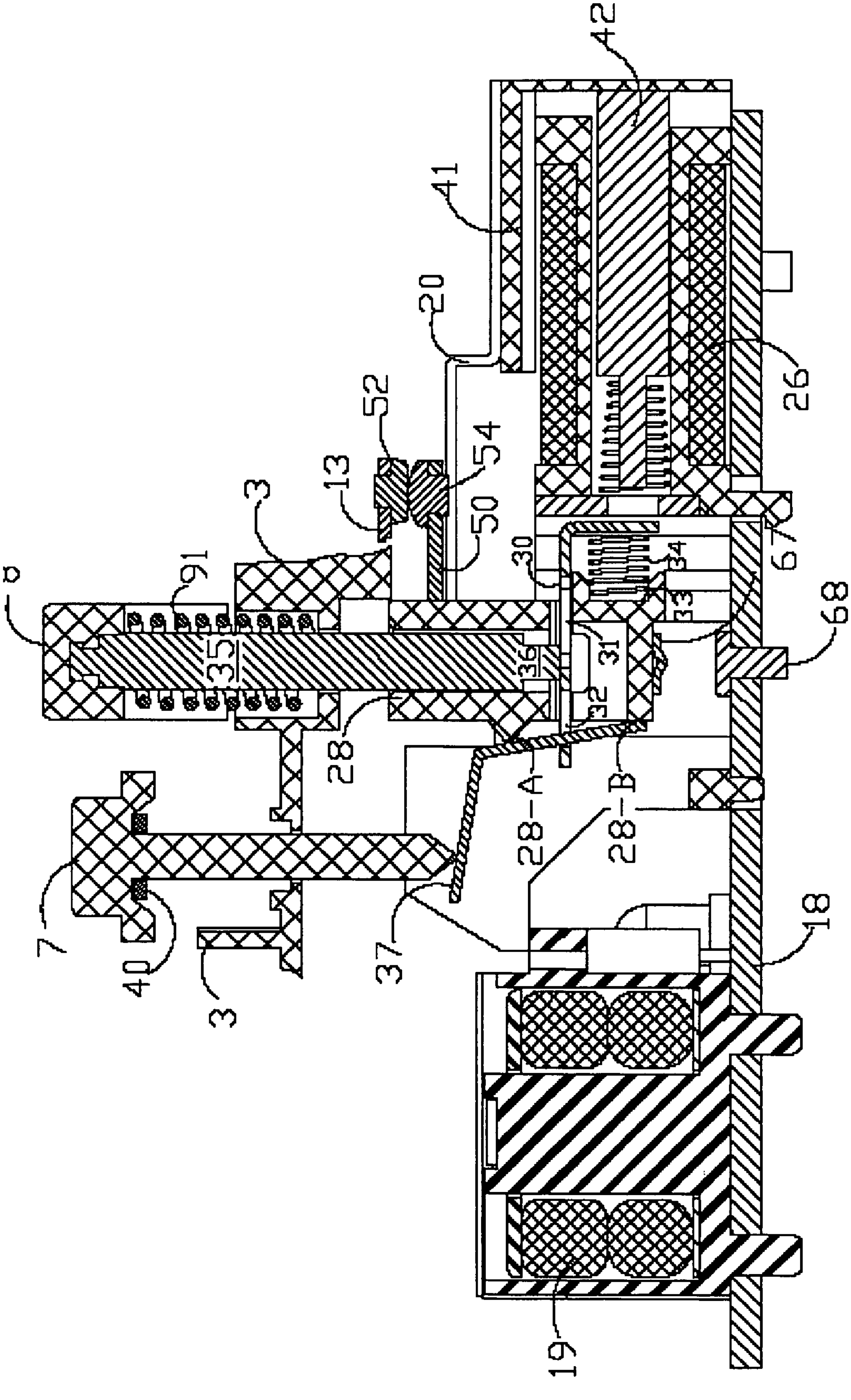
FIG. 5B is a partial cross-sectional view along the C-C line in FIG. 3, where the GFCI is illustrated to be in a normal state.
Figure 5C:
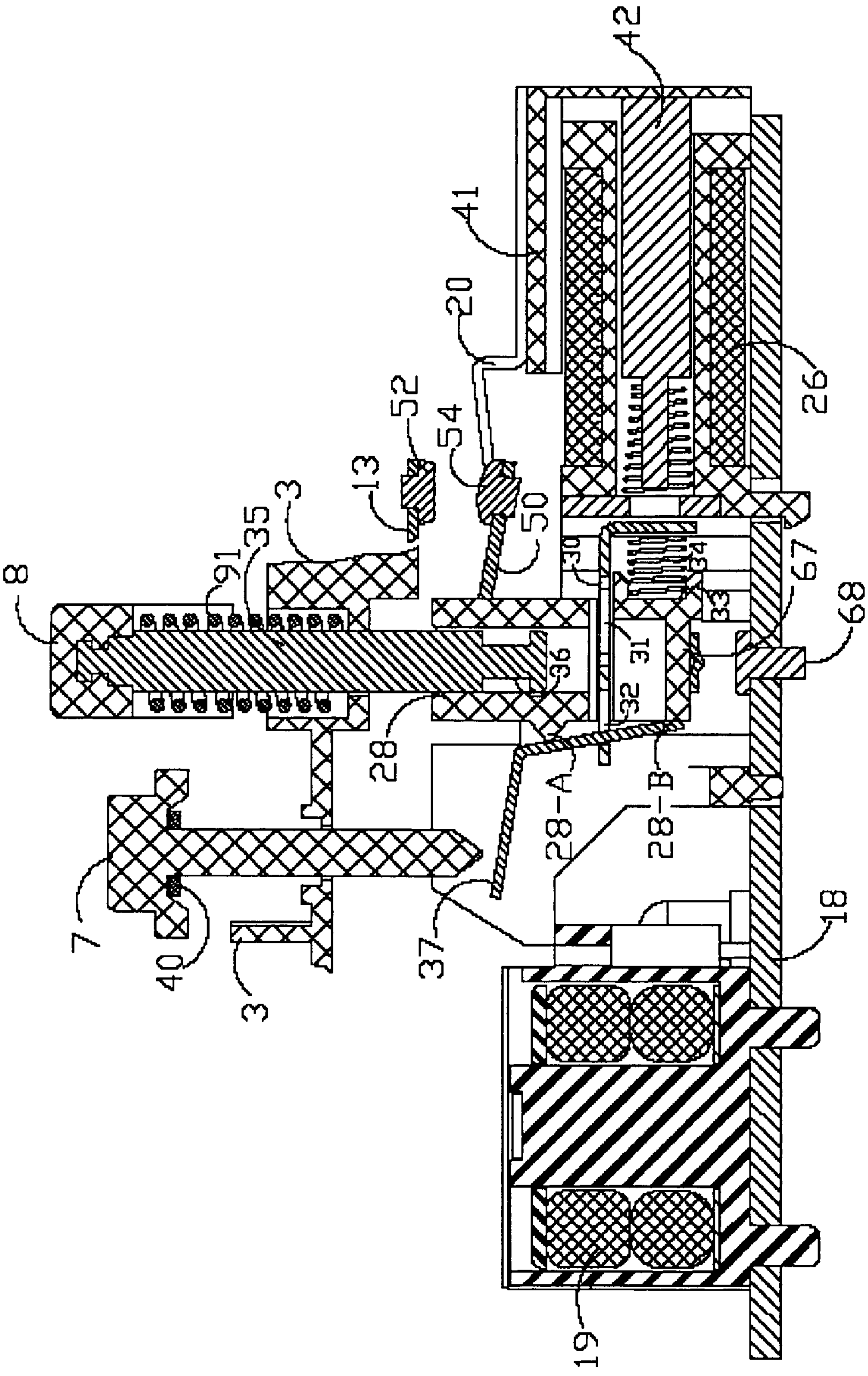
FIG. 5C is a partial cross-sectional view along the C-C line in FIG. 3, illustrating the trip status of the GFCI after a test button is pressed.
Figure 5D:
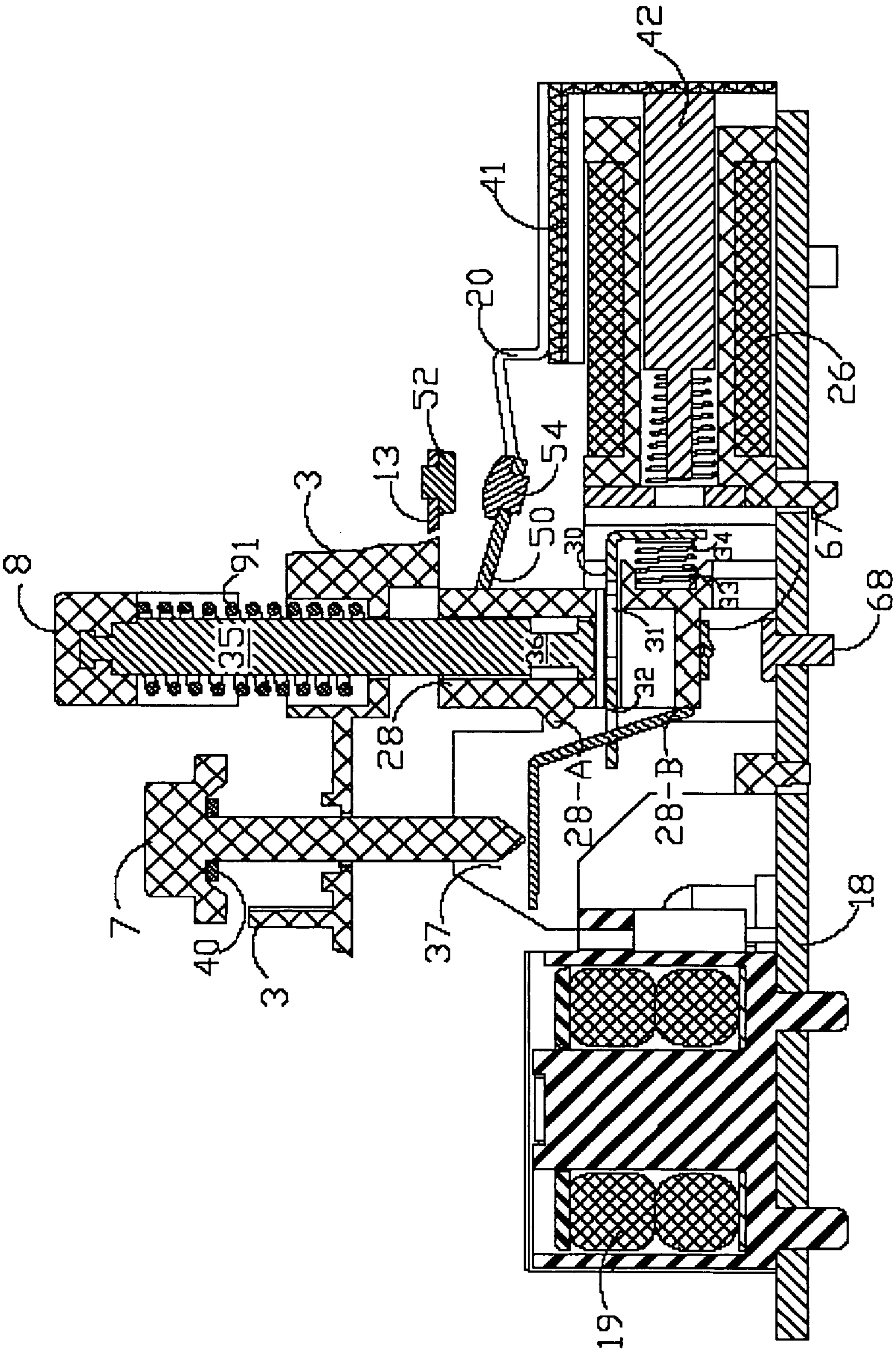
FIG. 5D is a partial cross-sectional view along the C-C line in FIG. 3, illustrating the GFCI being forcibly released after the test button is pressed.

FIG. 5A is a partial cross-sectional view along the C-C line in FIG. 3, where the circuit interrupting device is illustrated to be in a reset and start configuration. FIG. 5B is a partial cross-sectional view along the C-C line in FIG. 3, where the circuit interrupting device is illustrated to be in a normal state. FIG. 5C is a partial cross-sectional view along the C-C line in FIG. 3, illustrating the trip status of the circuit interrupting device after the test button 7 is pressed. FIG. 5D is a partial cross-sectional view along the C-C line in FIG. 3, illustrating the circuit interrupting device being forcibly released after the test button 7 is pressed.

As shown in FIG. 1, FIG. 4 and FIG. 5A, the tripping device, which is located on the circuit board 18, may enable the flexible power input metal pieces 50, 51 and the power output conductors 13, 14 to be connected or disconnected, thus supplying power to or cutting off power from the flexible power output metal pieces 20, 21 and the power output terminals 80, 81 through the power output conductors 13, 14. The tripping device includes a tripper 28, a locking member 30, a locking spring 34, a tripping lever 37, and a solenoid coil 26, i.e., solenoid coil (SOL).

The tripper 28 may have a cylindrical body and is located below the reset button 8. The left side and the right side of the tripper 28 extend outwardly to form lifting arms. The flexible power input metal pieces 50, 51 and the flexible power output metal pieces 20, 21 are located on the upper part of the lifting arms on both sides of the tripper 28 and can move up and down with the tripper 28. As shown in FIG. 4, the movable contact 54 on the flexible neutral power input metal piece 50 and the movable contact 22 on the flexible neutral output metal piece 20 cross each other at a position above the side lifting arm of the tripper 28. Similarly, the movable contact 55 on the flexible hot power input metal piece 51 and the movable contact 23 on the flexible hot output metal piece 21 cross each other at a position above the side lifting arm of the tripper 28.

A longitudinal central through hole 29 is formed on top of the tripper 28 and is embedded in a reset directional lock 35, which is equipped with a reset spring 91 and embedded at the bottom of the reset button 8. The reset directional lock 35 has a blunt end and is movable in a vertical direction in the central through hole 29. A circular recessed locking slot 36 is formed in the lower part of the reset directional lock 35 close to the bottom of the reset directional lock 35 to form a groove. A movable "L"-shaped locking member 30 made of a metal material is arranged in the lower part of tripper 28 and penetrates through the tripper 28. A through hole 31 is formed on the horizontal side of the locking member 30. The locking member 30 is movable through the through hole 31 in a horizontal direction between an aligned position (in which the through hole 31 of the locking member 30 is aligned with the blunt end of the rest directional lock 35 to allow the rest directional lock 35 to pass through) and a misaligned position (in which the circular recess locking slot 36 of the directional lock 35 is locked into the through hole 31 of the locking member 30). A circular slot 33 is formed between the side wall of tripper 28 and the inner side of the locking member 30. The locking spring 34 is arranged in the circular slot 33. The solenoid coil 26 with a built-in movable iron core 42 is arranged outside of the side wall of the locking member 30. The movable iron core 42 inside the solenoid coil 26 faces the side wall of the locking member 30. A protective shield 41 is arranged above the solenoid coil 26. One end of the insulated mid-level support 3 presses against the protective shield 41.

A hole 32 is formed at one end on the top surface of the locking member 30. A "7"-shaped tripping lever 37 penetrates through the hole 32. Tripping lever 37 is located directly underneath the test button 7. A pivot point 28-A is arranged on the side wall of tripper 28 close to the tripping lever 37. The tripping lever 37 can rotate around the pivot point 28-A on the side wall of tripper 28.

The tripper 28, the locking member 30, the locking spring 34, and the tripping lever 37 are connected to each other to form an integral body that can move freely.

The movable iron core 42 located within the solenoid coil 26 can be moved to push the locking member 30 when the solenoid coil 26 is supplied power. As a result, the reset directional lock 35 embedded in the bottom of the reset button 8 can move up and down along the central through hole 29 of the tripper 28 and the through hole 31 of the locking member 30 to reset or trip the reset button 8 to detect whether or not the circuit interrupting device has power output. In other words, the reset button 8 is reset or tripped through the tripping device to control the power output of the circuit interrupting device.

As shown in FIG. 4 and FIG. 8, a differential transformer 19 (differential transformers L1, L2 in FIG. 8) is located on the circuit board 18 to detect a leakage current on the circuit board 18. A hot wire ("HOT") and a neutral wire ("WHITE") penetrate through the differential transformer 19. When an electrical current leakage occurs in a power supply loop, the differential transformer 19 outputs a voltage signal to a leakage detection integrated circuit chip IC1 (e.g., model number RV4145) (shown in FIG. 7). Pin 5 of the leakage detection integrated circuit chip IC1 outputs a control signal to turn on a silicon controlled rectifier (SCR) V23 to trip the devices on the circuit board 18 so as to interrupt the power output.

Figure 6A:
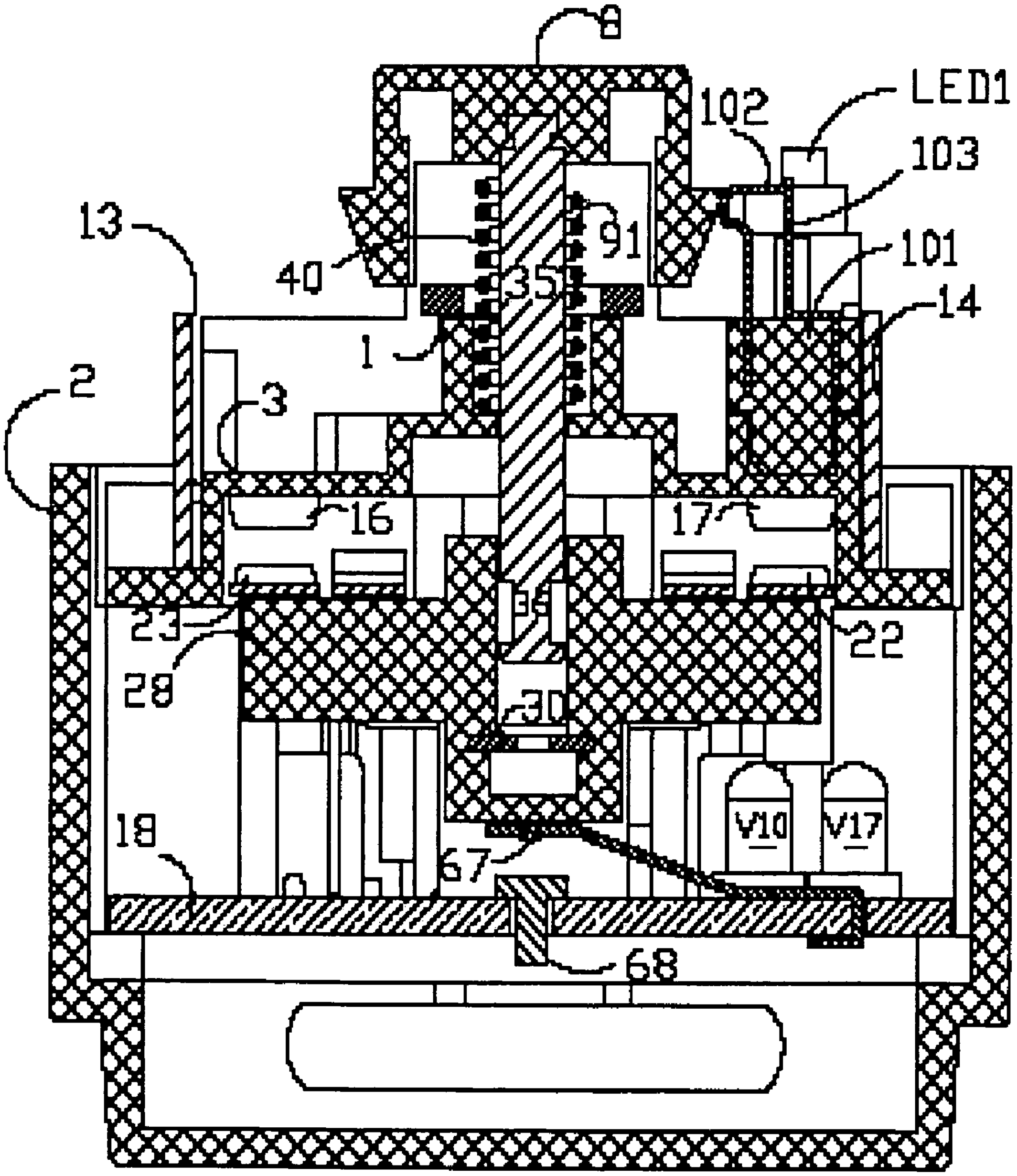
FIG. 6A is a partial cross-sectional view along the A-A line in FIG. 3, illustrating the GFCI in a state after being tripped.
Figure 6B:
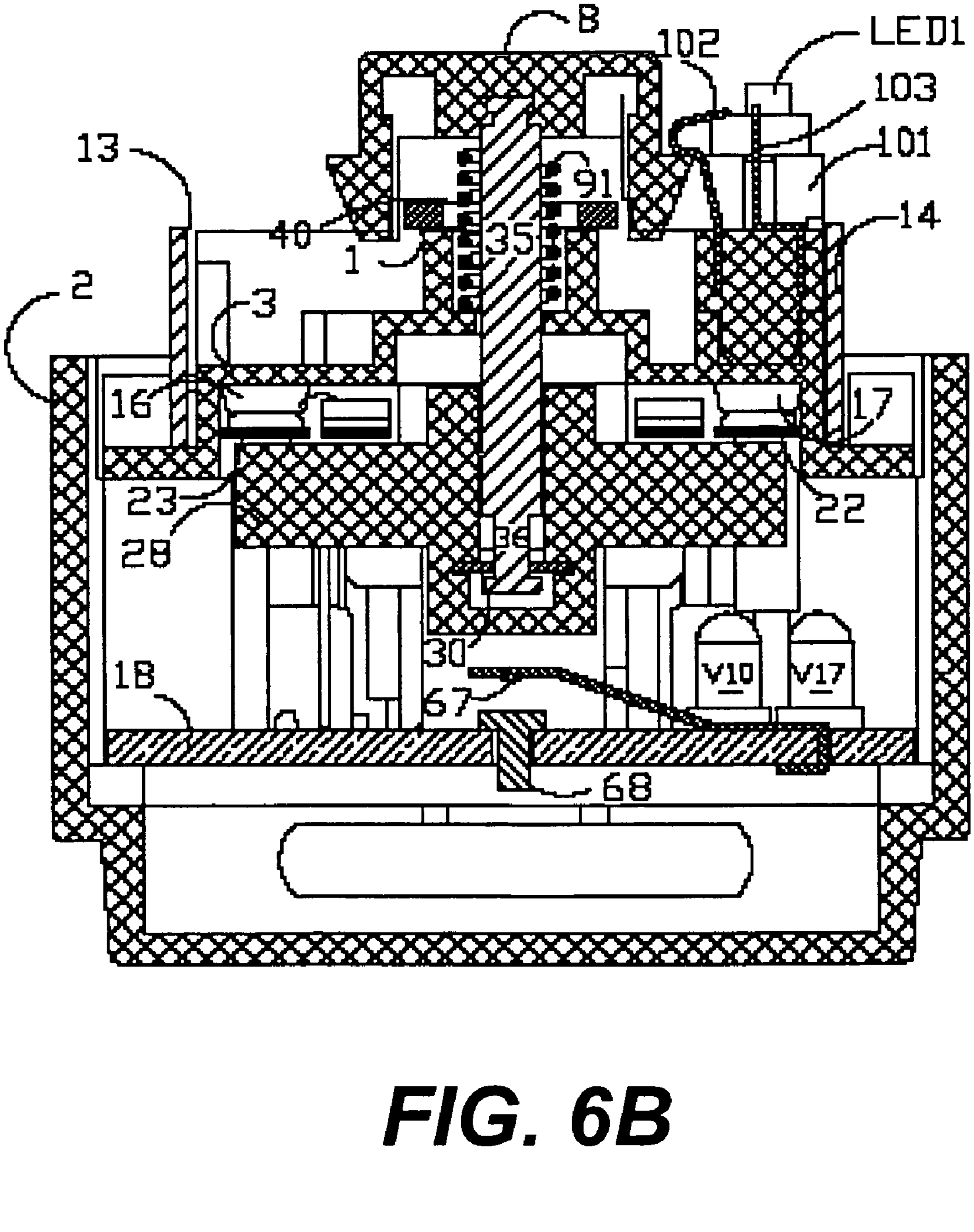
FIG. 6B is a partial cross-sectional view along the A-A line in FIG. 3, illustrating the GFCI in a state after being reset.

As shown in FIG. 4, the circuit board 18 has two indicating lights used for indicating whether or not the service life of the circuit interrupting device has ended. One of the lights is a normal status indicating light V17 (e.g., a green light-emitting diode $LED_2$), while the other is a failure status indicating light V10 (e.g., a red or yellow light-emitting diode $LED_1$). FIG. 6A is a partial cross-sectional view along the A-A line in FIG. 3, illustrating the circuit interrupting device in a state after being tripped. FIG. 6B is a partial cross-sectional view along the A-A line in FIG. 3, illustrating the circuit interrupting device in a state after being reset. As shown in FIGS. 6A and 6B, a light-guiding tube LED1 arranged in the longitudinal direction is set on the indicating lights V17, V10. The top of the light-guiding tube LED1 is located below the indicating light hole 30-A on the surface of the front lid 2. The light emitted from the two indicating lights V17, V10 is refracted through the light-guiding tube LED1 to the surface of the circuit interrupting device.

FIG. 7 is a block diagram illustrating an exemplary control circuit of a circuit interrupting device that automatically checks for component failure through closed-loop control. FIG. 8 is a detailed circuit diagram of the exemplary control circuit used by the circuit interrupting device.

As shown in FIG. 6A, FIG. 6B, FIG. 7, and FIG. 8, the circuit interrupting device also uses a status test switch KR1 that interacts with the reset button 8 (RESET). The status test switch KR1 includes a fixed frame 101 and two spring pieces 102, 103. The spring piece 102 is connected, through resistors R7, R3 and a capacitor C1, to pin 2 of an end-of-service-life detection chip IC2, (e.g., model number ZQC-051208), i.e., end-of-service-life detection integrated circuit chip. The spring piece 103 is connected to pin 4 of the end-of-service-life detection chip IC2. When the reset button 8 is in a tripped state, the spring piece 102 of the status test switch KR1 is in contact with the spring piece 103 due to the inclined side surface of the reset button 8 to enter into a conductive state (FIG. 6A). When the reset button 8 is in a reset state, since the inclined side surface of the reset button 8 moves downwards, the spring piece 102 restores the original shape and is separated from the spring piece 103 to enter into a non-conductive state (FIG. 6B). The status test switch KR1 interacts with the rest button 8 to test the status of the reset button 8 and to transmit the status signal to the end-of-service-life detection chip IC2.

As shown in FIG. 5A, FIG. 7, and FIG. 8, a reset start switch KR4, which is made of a flexible metal material, is arranged between the bottom of the tripper 28 and the circuit board 18. The reset start switch KR4 includes two spring pieces 67, 68. The spring piece 67 is connected to pin 5 of the leakage current detection integrated circuit chip IC1, while the spring piece 68 is connected to pin 1 of the end-of-service-life IC chip IC2 through a resistor R10. The reset start switch KR4 also interacts with the reset button 8. When the reset button 8 is depressed, the reset start switch KR4 is closed and in a conductive state. When the reset button 8 is released, the reset start switch KR4 is opened and in a non-conductive state.

As shown in FIG. 7 and FIG. 8, the internal control circuit of the circuit interrupting device includes a main circuit U1 used for detecting a leakage current and resetting/tripping the reset button 8, a simulated leakage current generation circuit U2, a reset status checking circuit U3 for identifying the reset/trip status of the reset button 8, a simulated current detection feedback circuit U4, a reset confirmation circuit U5, an end-of-service-life detection circuit U6, a manual test circuit U7, and an output status display circuit U8.

After power input terminals $L_{IN}$, $N_{IN}$ of the circuit interrupting device are connected to the hot and neutral wires inside the wall, the circuit interrupting device is supplied power, and its simulated leakage current generation circuit U2 automatically generates a leakage current upon power-on. At that time, if the circuit interrupting device is working properly, the main circuit U1 detects the simulated leakage current and outputs a control signal to turn on the tripping device to reset or trip the reset button 8. The end-of-service-life detection circuit U6 receives and transmits a status signal through the reset status checking circuit U3, determines the status of the reset based on whether a reset confirmed signal is sent by the simulated current detection feedback circuit U4, and sends the reset signal to the reset confirmation circuit U5. After confirming that the circuit interrupting device works properly, the end-of-service-life detection circuit U6 outputs a control signal to turn on the normal status indicating light V17. On the other hand, if the service life of the circuit interrupting device has ended, the end-of-service-life detection circuit U6 outputs a control signal to turn on the failure status indicating light V10 to remind the user to replace the circuit interrupting device with a new one.

Besides the function of automatically generating a simulated leakage current upon power-on to check whether the circuit interrupting device can still protect against any electrical current leakage, the circuit interrupting device may also generate a simulated leakage current through the manual test circuit U7 when the user presses a test button 7 to trip the circuit interrupting device.

Also as shown in FIGS. 7 and 8, the main components of the exemplary main circuit include but are not limited to: differential transformers L1, L2 used for detecting leakage, the leakage current detection integrated circuit chip IC1, the end-of-service-life detection chip IC2, the silicon control rectifier, and the solenoid coil 26.

The simulated leakage current generation circuit U2, as shown in FIG. 7, automatically generates a simulated leakage current in the circuit interrupting device by a leakage current simulation circuit, which contains a serially connected resistor R2 and a rectifier/diode bridge V6-V9 (the main components of the leakage current simulation circuit part of U2 includes resistor R2, rectification bridge V6~V9, unilateral silicon controlled V12, coil L4, triode V14, capacitors C10, C12, resistors R15, R17 and detector diodes V13). One end of the resistor R2 is connected to the hot wire $L_{IN}$ of the power input terminal, while the opposite end is connected to the neural wire $N_{IN}$ of the power input terminal through the rectifier/diode bridge V6-V9. When the circuit interrupting device is supplied power, the serially connected resistor R2 and rectifier/diode bridge V6-V9 automatically short-circuit the hot and neutral wires to generate a simulated leakage current or a ground fault. The simulated leakage current generation circuit U2 can display a failure signal if any of the main components in the main circuit U1 does not work properly by containing a failure display circuit, which contains a LED1 light V10, regulated diode V11 and unilateral silicon controlled V12 to display a failure status indicating light. A preferred failure status indicating light is red or yellow light-emitting diode.

Since the hot power wire $L_{IN}$ and neutral power wire $N_{IN}$ simultaneously pass through the differential transformers L1 (1000:1) and L2 (200:1), when the current vector sum of the hot and neutral wires is not zero, i.e., when there is a leakage current, the differential transformers L1, L2 immediately detect a voltage signal at a certain level and send the voltage signal to signal input pins, i.e., pin 1, pin 2, of the leakage detection integrated circuit chip IC1 if the circuit interrupting device is working properly. Pin 5 of the leakage detection integrated circuit chip IC1 then outputs a signal to a gate of the silicon controlled rectifier V23 to trigger and turn on the silicon controlled rectifier V23. As a result, the solenoid coil 26 in the tripping device is supplied power, and the iron core 42 inside the solenoid coil 26 (L3 in FIG. 8) moves to push the locking member 30 of the tripping device so as to interrupt the power output. In the meantime, the voltage level at pin 1 of the end-of-service-life detection chip IC2 is elevated to turn on the output status display circuit U8. As a result, a silicon controlled rectifier V18 becomes conductive, and the normal status indicating light V17 is turned on. On the other hand, if the service life of the circuit interrupting device has ended, the voltage level at pin 3 of the end-of-service-life detection chip IC2 is elevated to turn on the failure status display circuit. As a result, a silicon controlled rectifier V11 becomes conductive, and the failure status indicating light V10 is turned on to remind the user to replace the device with a new one.

As shown in FIG. 8, if the circuit interrupting device works normally and is able to provide electrical leakage and ground fault protection, the voltage level at pin 1 of the end-of-service-life detection chip IC2 is elevated. When the user presses the reset button 8, since the reset start switch KR4 interacts with the reset button 8, the reset start switch KR4 is closed at the same time when the reset button 8 is pressed. The silicon controlled rectifier V23 is triggered to become conductive. The solenoid coil 26 (L3 in FIG. 8) is supplied power so that current flows through the solenoid coil 26 to generate an electromagnetic field. The iron core 42 inside the solenoid coil 26 moves to push the locking member 30 of the tripping device.

As shown in FIG. 5B, the circular recessed locking slot 36 of the reset directional lock 35 embedded at the bottom of the reset button 8 is seized in the through hole 31 of the locking member 30. When the reset button 8 is released, the driving tripper 28 moves up to elevate the flexible metal pieces 50, 51, 20, 21 located above the lifting arms on the two sides of the tripper 28. As a result, the movable contacts 54, 55 on the flexible power input metal pieces 50, 51 make contact with the fixed contacts 52, 53 on the power output conductors 13, 14 to power up the output conductors 13, 14. Powering up the output conductors 13, 14 in turn allows the flow of electricity to the power output sockets 5, 6 on the face of the circuit interrupting device. Also, the movable contacts 22, 23 on the flexible output metal pieces 20, 21 make contact with the fixed contacts 15, 16 on the power output conductors 13, 14 to power up the flexible output metal pieces 20, 21, which are in contact with the power output terminals 80, 81. Powering up the flexible output metal pieces 20, 21 allows electricity to be output to the power output terminals 80, 81 of the circuit interrupting device and to the power output sockets 5, 6 on the face of the circuit interrupting device. As a result, the circuit interrupting device operates normally.

As shown in FIGS. 8, 5C, when the test button 7 is pressed, a simulated leakage current is generated. After the differential transformers L1, L2, i.e., differential transformer 19, detect the leakage current, differential transformers L1, L2 output a voltage signal to the leakage detection integrated circuit chip IC1, which elevates the voltage at pin 5 of the leakage detection integrated circuit chip IC1, which in turn makes the silicon controlled rectifier V23 conductive. A current flows through the solenoid coil 26 (L3 in FIG. 8) to generate an electromagnetic field, which pulls the iron core 42 to push and move the locking member 30, as shown in FIG. 5C. The bottom part of the circular recessed locking slot 36 of the reset directional lock 35 penetrates through the central through hole 31 of the locking member 30. The reset button 8 is tripped, allowing the tripper 28 to drop. The flexible metal pieces 50, 51, 20, 21 located above the two lifting arms of the tripper 28 drop as well to disconnect the movable contacts 54, 55 on the flexible power input metal pieces 50, 51 from the fixed contacts 52, 53 on the power output conductors 13, 14. The fixed contacts 15, 16 on the power output conductors 13, 14 are disconnected from the movable contacts 22, 23 on the flexible output metal pieces 20, 21 so that neither the power output conductors 13, 14 nor the flexible output metal pieces 20, 21 are supplied power.

As a result, no power is output to the power output terminals 80, 81 of the circuit interrupting device or to the power output sockets 5, 6 on the face of the front lid 2 of the circuit interrupting device, so that the entire power output of the circuit interrupting device is interrupted.

The circuit interrupting device also allows a user to forcibly and mechanically trip the reset button 8 by pressing the test button 7 to interrupt the power output of the circuit interrupting device. As shown in FIG. 5D, the test button 7 has a tail end that penetrates through the insulated mid-level support 3, which touches upon the end of the tripping lever 37. When the service life of the circuit interrupting device has ended and the reset button 8 cannot be tripped by using a simulated leakage current, the user can further press down the test button 7 to forcibly trip the circuit interrupting device. This tail end has a slipped over spring 40, i.e., test sheet. If the user wants to detect whether the mechanical operation of the circuit interrupting device is operational and reliable, the user can depress the test button 7. The tail end of the test button 7 pushes the end of the tripping lever 37 to move downwards to pull the locking member 30. The locking spring 34 on the other side of the locking member 30 is compressed. The circular recessed locking slot 36 on the directional lock 35 jumps out of the through hole 31 of the locking member 30. The tripper 28 falls, and the flexible power input metal pieces 50, 51 fall as well. The movable contacts on the flexible power input metal pieces 50, 51 are disconnected from the fixed contacts on the power output conductors 13, 14. As a result, power output conductors 13, 14 are not supplied power. The flexible output metal pieces 20, 21 connected to the power output terminals 80, 81 are not supplied power, either. Since neither the power output conductors 13, 14 nor the power output terminals 80, 81 are supplied power, no power is output to the load terminals, i.e., the power output terminals 80, 81 of the circuit interrupting device, or to the power output sockets 5, 6 on the face of the circuit interrupting device front lid 2.

As shown in FIG. 4, two pairs of position limiting pieces 43, 44 and 73, 74 are arranged on the protective shield 41 of the solenoid coil 26 below the movable contacts of the flexible power input metal pieces 50, 51 and below the flexible output metal pieces 20, 21.

Figure 9:
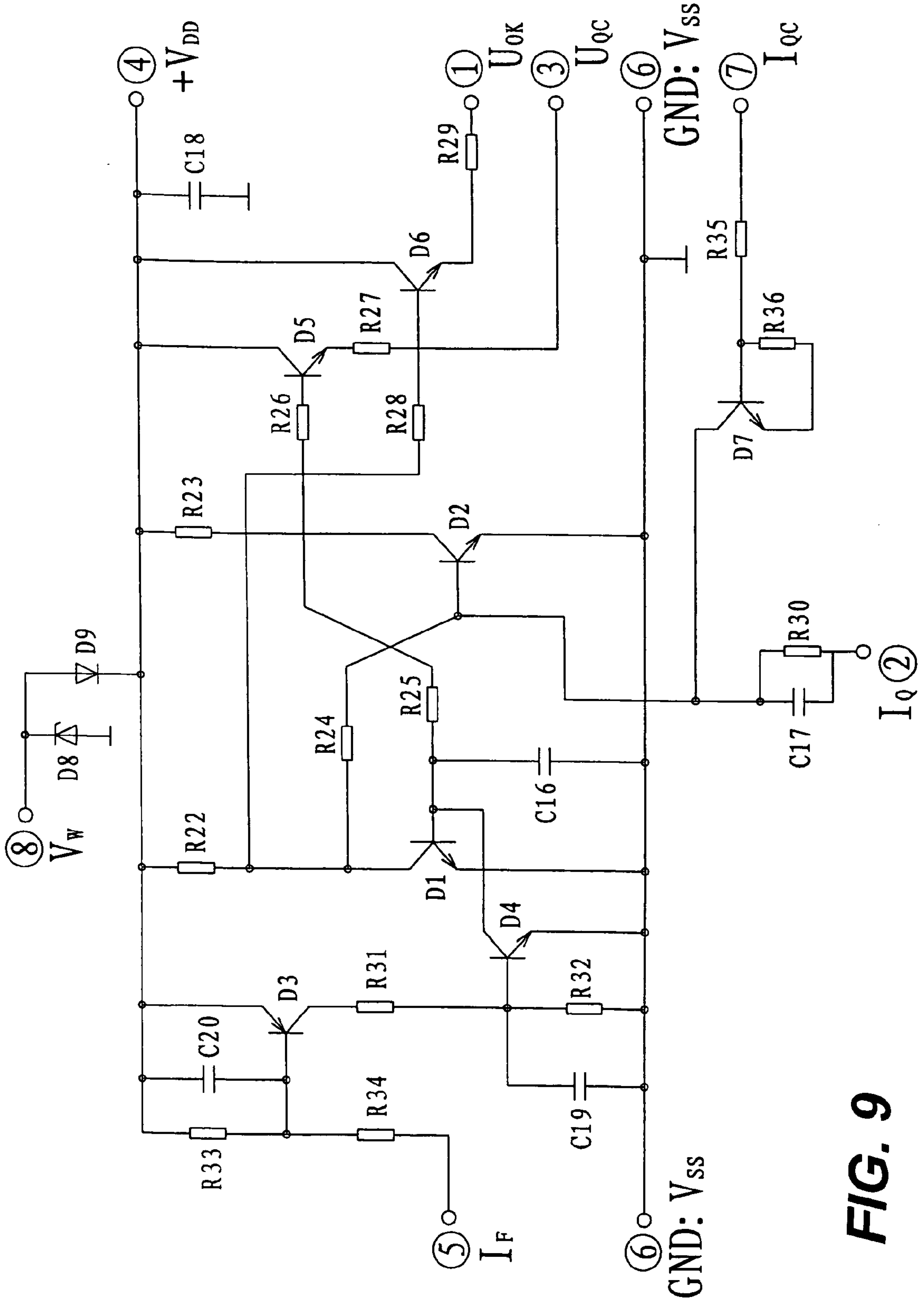
FIG. 9 is a wiring diagram of an exemplary internal control circuit of an IC2 module circuit (e.g., module circuit ZQC-051208T)
Figure 10:
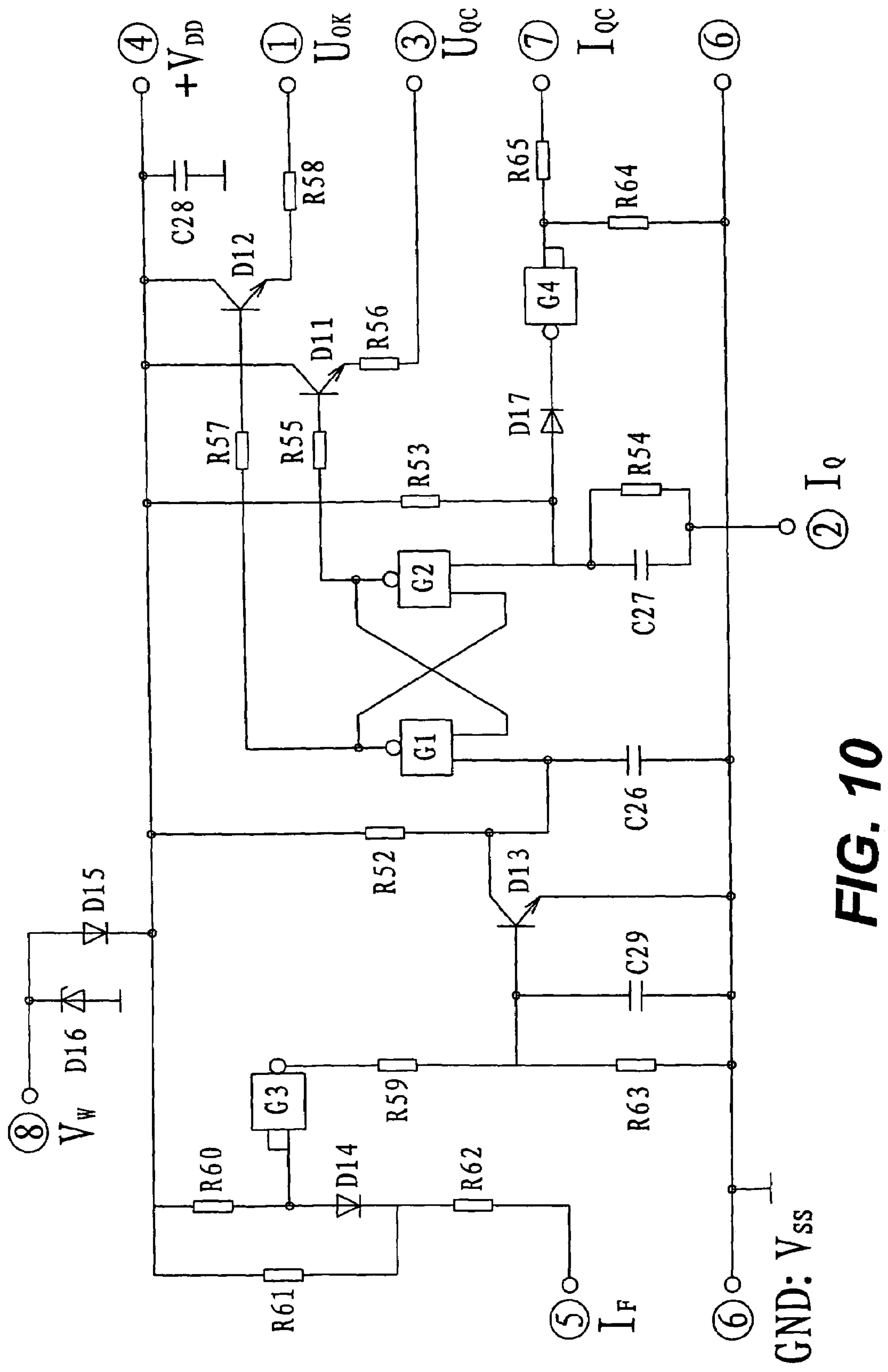
FIG. 10 is a wiring diagram of an exemplary internal control circuit of another IC2 module circuit (e.g., module circuit ZQC-051208H).

FIG. 9 is a wiring diagram of an exemplary internal control circuit of an IC2 module circuit (e.g., module circuit ZQC-051208T). FIG. 10 is a wiring diagram of an exemplary internal control circuit of another IC2 module circuit (e.g., module circuit ZQC-051208H). As shown in FIG. 9 and FIG. 10, IC2 (ZQC-051208T/H) contains a set of circuits including a flip-flop latch circuit. The exemplary circuits in the end-of-service-life detection end-of-service-life integrated circuit chip IC2 may be a hard module circuit installed on a printed circuit board substrate or a ceramic based substrate and may be packed in an integrated circuit with 8 pins, thus achieving the outer housing packing for the integrated circuit. The internal logic connection designs are as shown in FIG. 3 for the IC2 module circuit ZQC-051208T, i.e., transistor set containing a flip-flop latch circuit, and in FIG. 4 for the IC2 module circuit ZQC-051208H, i.e., CMOS integrated circuit transistor compound set containing a flip-flop latch circuit.

A number of electrodes are arranged in the IC2 module circuit ZQC-051208T/H:

(1) Electrode 1 (pin 1) is a reset voltage output terminal (i.e., $U_{ok}$). Electrode 1 (pin 1) is at a high voltage when outputting a reset voltage and at a low voltage when not outputting the reset voltage.

(2) Electrode 2 (pin 2) is a reset or release status input terminal (i.e., $I_Q$, which receives a signal from KR1 switch concerning the status of trip or reset). When a high voltage is supplied to electrode 2 (pin 2), the end of life test may be started, that is, electrode 3 is inverted into a high voltage, and at the same time, electrode 1 is restored as a low voltage.

(3) Electrode 3 (pin 3) is a terminal (i.e., $U_{QC}$, which sends a signal to U2 circuit to generate a simulate leakage current) that controls the generation of a simulated leakage current. When electrode 3 outputs a high voltage, it causes the generation of a simulated leakage current.

(4) Electrode 4 (pin 4) is a terminal (i.e., $V_{DD}$, which is the input terminal for IC2's power source) for supplying power to the IC2 and has a positive power supply mode ($+V_{DD}$).

(5) Electrode 5 (pin 5) is an input terminal (i.e., $I_F$, which receives signal from the simulated test feedback circuit). When a negative pulse is supplied, the pulse indicates that the circuit interrupting device has passed the end of life test and can work normally, thus making it possible for electrode 3 to be inverted into a low voltage and at the same time, making it possible for electrode 1 to be inverted into a high voltage.

(6) Electrode 6 (pin 6) is a power supply reference grounding (GND) terminal (i.e., $V_{SS}$).

(7) Electrode 7 is a backup start and test input terminal (i.e., $I_{QC}$).

(8) Electrode 8 is a backup power supply terminal (i.e., $V_W$).

The exemplary circuits inside the end-of-service-life detection chip IC2 function as follows. As shown in FIG. 9, in the module circuit ZQC-051208T, transistors D1, D2 and resistors R22, R23, R24, R25 combine to form a flip-flop latch circuit. Transistor D3, resistors R33, R34, and capacitor C20 combine to form a feedback signal input circuit. Transistor D4, resistors R31, R32, and capacitor C19 are an inverter circuit. Transistor D5 and resistors R26, R27 combine to form an emitter circuit. Transistor D6 and resistors R28, R29 combine to form a test passage circuit. Capacitor C17 and resistor R30 combine to form a start and test input circuit. Transistor D7 and resistors R35, R36 combine to form the backup start and test input circuit. Transistors D8, D9 form a backup power supply circuit.

The flip-flop latch circuit receives and transmits a status signal from the reset status checking circuit in U3, and passes this status signal to the emitter circuit within IC2 (U6), which further transmits the signal to the stimulated leakage current generation circuit in U2 to generate a simulated leakage current. The flip-flop latch circuit also receives a reset confirmed signal from the simulated current detection feedback circuit in U4 when the components in the main circuit U1 is working normally, and transmits the reset confirmed signal through the feedback signal input circuit within IC2 (U6) to the reset confirmation circuit (U5), and optionally to the output status display circuit in U8, which allows a normal status indicating light to be turned on.

As shown in FIGS. 6-1, 6-2, 7 and 8, the reset status checking circuit in U3 is connected to a status test switch KR1, which is consisted of a fixed frame 101 and two spring pieces 102, 103. The spring piece 102 is connected a fixed frame 101 and two spring pieces 102, 103. The spring piece 102 is connected, through resistors R7, R3 and a capacitor C1 in the reset status checking circuit, to pin 2 of the end-of-service-life detection chip IC2. The spring piece 103 is connected directly to pin 4 of the end-of-service-life detection chip IC2.

As shown in FIGS. 5A-C, 7 and 8, the reset confirmation circuit in U5 contains a reset start switch KR4. The reset start switch KR4 includes two spring pieces 67, 68. The spring piece 67 is connected to pin 5 of the leakage current detection integrated circuit chip IC1, while the spring piece 68 is connected to pin 1 of the end-of-service-life IC chip IC2 through a resistor R10. The reset start switch KR4 also interacts with the reset button 8. When the reset button 8 is depressed, the reset start switch KR4 is closed and in a conductive state. When the reset button 8 is released, the reset start switch KR4 is opened and in a non-conductive state.

As shown in FIG. 10, in the module circuit ZQC-051208H, the IC2 is a Complementary-symmetry/metal-oxide semiconductor (CMOS) integrated circuit transistor compound set containing exception gate circuits G1, G2, G3, G4, resistors R52-R65, transistors D11, D12, D13, and diodes D14, D15, D16, D17. When the circuit interrupting device is powered on and at a tripped state, due to the contact of KR1 switch, a low voltage signal is input to terminal $I_Q$ of electrode 2 (pin 2) and to the input terminal of G2. At the same time, a high voltage signal is output from the output terminal of G2, via R55, D11, R56, to the output terminal $U_{QC}$ of electrode 3 (pin 3), which allows U2 circuit to generate a simulated leakage current to start an end-of-service-life detection test. If the components of the circuit interrupting device work normally, a feedback signal is sent to terminal $I_F$ of electrode 5 (pin 5). This feedback signal passes through R60, R61, R62, D14, to reach the input terminal of G3. At this time, the output terminal of G3 outputs a high voltage signal, which passes through R59, R63, D13 to reverse the voltage level at G1 and G2. In other words, G1 is reversed from outputting a low voltage "0" to outputting a high voltage "1" while G2 is reversed from outputting a high voltage "1" to outputting a low voltage "0." Also, the high voltage output signal from G1 passes through resistor R57, the current was then magnified by D12 and further passed through R58 to reach the output terminal of $U_{OK}$ at electrode 1 (Pin 1), which provide the necessary voltage for resetting the circuit interrupting device. Optionally, a circuit which includes A4, R64, R65, and D17 is connected to electrode 7 (Pin 7). This circuit forms a forcible automatic testing circuit. When a high voltage is input to Pin 7, this signal passes through R64, R65, the input terminal of G4, and then output a low voltage signal from the output terminal of G4, which, after passing through D17, reaches the input terminal of G2. This causes the output terminal of G2 to output a high voltage signal to Pin 3, and starts the automatic testing process.

As shown in FIG. 7, FIG. 8, and FIG. 9, after the power input terminals $L_{IN}$, $N_{IN}$ of the circuit interrupting device are properly connected to the hot and neutral wires in the wall, the circuit interrupting device is supplied power. When this circuit interrupting device is in a tripped state, the status test switch KR1 in the reset status checking circuit U3 is in a closed (conductive) state. At this time, the reset status checking circuit U3 sends a status identification signal to pin 2 of the end-of-service-life detection chip IC2 in the end-of-service-life detection circuit U6. The triode D1 immediately enters into a saturated state, D1 collector electrode is at a low voltage, D2 is in a cutoff state, D2 collector electrode is placed at a high voltage, and D5 in the emitter circuit outputs a high voltage to pin 3 of the end-of-service-life detection chip IC2 through the current limiting resistor R27. Pin 3 of the end-of-service-life detection chip IC2 immediately outputs this high voltage signal to the simulated leakage current generation circuit U2, driving a leakage current simulation circuit within the simulated leakage current generation circuit U2 to automatically generate a simulated leakage current. This simulated leakage current first arrives at the main circuit U1. If the functions of the circuit interrupting device are intact, this simulated leakage current passes through the main circuit U1, generating a low voltage signal at the positive electrode of a silicon controlled rectifier (SCR) V23 in the electro-magnetically driven release loop (i.e., the solenoid coil [SOL] L3). After passing through an SCR V22 of the simulated current detection feedback circuit U4, this low voltage signal is input to the resistor R34 of pin 5 of the IC2 through the resistor R14, and is added to the base electrode of the feedback and test transistor D3. The low voltage signal is again input to the inverter transistor D4 through the resistor R31.

After the low voltage signal passes through the inversion flip-flop, the status of D1, D2 is inverted into the following, in an extremely short time: D1 is in a cutoff state, D2 converts from a cutoff state into saturation, D2 collector electrode is placed at a low voltage, and D1 collector electrode is at a high voltage and outputs a high voltage $U_{OK}$ from pin 1 of the end-of-service-life detection chip IC2, through the test passage circuit R28, D6, R29. This high voltage $U_{OK}$ is added to the reset confirmation circuit U5 and the output status display circuit U8. This high voltage $U_{OK}$ allows one of the two terminals of the reset start switch KR4 in the reset confirmation circuit U5 to have a high voltage through the current limiting resistor R31, while the other terminal is connected to the control electrode G of the silicon controlled rectifier V23, thus enabling the circuit interrupting device to be in a state capable of being reset. At the same time, pin 3 of the end-of-service-life detection chip IC2 is turned into a low voltage, allowing the simulated leakage current generation circuit U2 to stop generating any simulated leakage current. At this time, when the reset button 8 is pressed, the circuit interrupting device can be reset, turning on the normal status indicating light V17 in the output status display circuit U8. At the same time, the status test switch KR1 is disconnected.

If a key component in the circuit interrupting device is damaged or if the circuit interrupting device has come to the end of its service life, the above series of automatic test process cannot be completed. The module circuit ZQC-051208T remains locked in a start test state, and pin 1 of the end-of-service-life detection chip IC2 remains in a low voltage state with no signal output to the reset confirmation circuit U5. As a result, the circuit interrupting device is in a state that cannot be reset. At the same time, pin 3 of the end-of-service-life detection chip IC2 continues to output a high voltage output to the simulated leakage current generation circuit U2, which uses this high voltage to drive and turn on the failure status indicating light V10 in the simulated leakage current generation circuit U2, thus reminding the user to promptly replace the circuit interrupting device that has come to the end of its service life.

If the functions of the circuit interrupting device are intact, the circuit interrupting device may function normally after being reset. When there is a current leakage in the circuit interrupting device, a test of the differential transformers L1, L2 may immediately detect that the vector sum of voltage is not zero, and sends a signal to signal input ends 1, 2 of the leakage detection integrated circuit chip IC1. Pin 5 of the leakage detection integrated circuit chip IC1 immediately outputs a control signal to the gate of the SCR V23, so that the SCR V23 is flip-flopped and bypassed, thus supplying power to a solenoid coil (SOL) L3 in the tripping device. The SOL L3's internal iron core 42 is engaged in a jerky motion, allowing the reset button 8 to be released, thus cutting off the power output of the circuit interrupting device. At this time, the release of the reset button 8 allows the status test switch KR1 in the reset status checking circuit U3 to be closed, triggering a re-test of the circuit interrupting device. If the functions of the circuit interrupting device are intact, pin 1 of the end-of-service-life detection chip IC2 in the end-of-service-life detection circuit U6 changes into a high voltage. This high voltage allows one end of the reset start switch KR4 in the reset confirmation circuit U5 to pass through the current limiting resistor R10 and to have a high voltage, thus allowing the circuit interrupting device to be in a state capable of being reset. After the reset button 8 is pressed, the circuit interrupting device is reset, thus turning on the silicon controlled rectifier V18 in the output status display circuit U8 and the normal status indicating light V17.

As noted above, upon power-on, the exemplary circuit interrupting device automatically generates a simulated leakage current to test whether the circuit interrupting device can still protect against a leakage current and whether the circuit interrupting device has come to the end of its service life. In addition, the circuit interrupting device may also generate a simulated leakage current by manually pressing the test button 7 in the manual test circuit U7. Pressing the test button 7 performs a routine circuit interrupting device function test and allows the circuit interrupting device to be tripped and released.

As shown in FIG. 7, FIG. 8, and FIG. 9, if the circuit interrupting device functions normally after being reset, the circuit interrupting device's leakage protection capability is intact. When the test button 7 is pressed, a simulated leakage current will be generated in two ways. First, a manual switch KT coupled to the test button 7 may be closed to generate a simulated leakage current. After the differential transformers L1, L2 detect a leakage current, the differential transformers L1, L2 output a voltage signal to the leakage detection integrated circuit chip IC1's signal input ends 1, 2. Pin 5 of the leakage detection integrated circuit chip IC1 immediately outputs a control signal to the gate of the SCR V23, so that the SCR V23 is flip-flopped and turned on, thus supplying power to the SOL L3 in the tripping device. The SOL L3's internal iron core 42 is engaged in a jerky motion, thus allowing the reset button 8 to be released to cut off the power output of the circuit interrupting device.

The second way of generating a simulated leakage current is by inputting a high voltage signal into pin 2 of the end-of-service-life detection chip IC2 after the test button 7 is pressed, causing pin 3 of the end-of-service-life detection chip IC2 to output a high voltage signal to the simulated leakage current generation circuit U2. After automatic conversion, the driving circuit of the simulated leakage current generation circuit U2 generates a simulated leakage current. This simulated leakage current is added to the simulated leakage current generated when the manual switch KT is closed. After the differential transformers L1, L2 detect this simulated leakage current, the differential transformers L1, L2 output a voltage signal to the signal input ends 1, 2 of the leakage detection integrated circuit chip IC1. Pin 5 of the leakage detection integrated circuit chip IC1 immediately outputs a control signal to the gate of the SCR V23, so that the SCR V23 is flip-flopped and is turned on, thus supplying power to the SOL L3 in the tripping device. The SOL L3's internal iron core 42 is engaged in a jerky motion, thus allowing the reset button 8 to be released to cut off the power output of the circuit interrupting device.

If after being reset the circuit interrupting device has come to the end of its service life or its key component has been damaged, when the test button 7 is manually pressed, the manual switch KT coupled to the test button 7 is closed, but the tripping device does not have a release response to the generated simulated leakage current. At the same time, a high voltage signal is sent to pin 2 of the end-of-service-life detection chip IC2. Pin 1 of the end-of-service-life detection chip IC2 is inverted into a low voltage state, and pin 3 outputs a high voltage signal to the simulated leakage current generation circuit U2, driving the simulated leakage current generation circuit U2 to automatically generate a simulated leakage current. Since the circuit interrupting device has come to the end of its service life, its detection signal cannot be transmitted to the simulated current detection feedback circuit U4. Pin 5 of the end-of-service-life detection chip IC2 cannot receive a correct feedback signal, thus causing pin 1 of the end-of-service-life detection chip IC2 to be inverted into a low voltage state, thus turning off the normal status indicating light V17 (e.g., green light-emitting diode $LED_2$). At this time, pin 3 of the end-of-service-life detection chip IC2 continues to be locked into a high voltage state, thus driving the failure status indicating light V10 (e.g., red or yellow light-emitting diode $LED_1$) to continue to emit a light, indicating that the circuit interrupting device has failed.

The exemplary circuit interrupting device described above not only provides electrical leakage and ground fault protection but also automatically checks whether the service life of the circuit interrupting device has ended and automatically displays the test result. If the circuit interrupting device can still protect against any electrical current leakage, the reset button 8 can be reset normally, and the normal status indicating light V17 is turned on, which indicates that the circuit interrupting device can function properly and there is power output from the circuit interrupting device. If the service life of the circuit interrupting device has ended, the end-of-service-life detection chip IC2 prohibits the resetting of the reset button 8, so that no power is output to the power output sockets 5, 6 on the face of the front lid 2 or to the load output terminals of the circuit interrupting device. This provides a signal to the user that the circuit interrupting device should be replaced. In addition, when certain component in the circuit interrupting device becomes defective, and particularly, when the solenoid coil is unable to work properly, a user can forcibly interrupt the power output of the receptacle in a mechanical manner by pressing the test button 7. The exemplary circuit interrupting device can be widely applied, is safe and easy to use, thus effectively ensuring the personal safety of the user as well as the safety of appliances.

While the circuit interrupting device that automatically checks for component failure and sets up a corrective reset mechanism has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

What is claimed is:

1. An end-of-service-life integrated circuit chip (IC2) capable of performing an end-of-service-life test in a circuit interrupting device, said IC2 comprising:

a flip-flop latch circuit comprises a first transistor and a second transistor; wherein said flip-flop latch circuit is adapted to receive and transmit a status signal when said circuit interrupting device is powered on and at a tripped state, allow said circuit interrupting device to be reset when components in a main circuit of said circuit interrupting device function normally, and disallow said circuit interrupting device to be reset when at least one of said components in said main circuit of said circuit interrupting device do not function properly; and an emitter circuit comprising a third transistor; wherein said emitter circuit is adapted to output said status signal from said flip-flop latch circuit through said third transistor to a simulated leakage current generation circuit of said circuit interrupting device to generate a simulated leakage current to test whether said components in said main circuit of said circuit interrupting device function normally; and wherein said IC2 performs said end-of-service-life test without a depression of a reset button in said circuit interrupting device.

2. The IC2 according to claim 1, wherein said status signal is generated from a reset status checking circuit when said circuit interrupting device is powered on and a status test switch (KR1) in said reset status checking circuit is in a conductive state.

3. The IC2 according to claim 2, wherein said KR1 comprises a fixed frame, a first spring piece and a second spring piece; and wherein in said conductive state, said first spring piece and said second spring piece are in contact with each other so that said status signal is generated and sent to said flip-flop latch circuit in said IC2.

4. The IC2 according to claim 2, wherein said KR1 is in said conductive state when said circuit interrupting device is at said tripped state.

5. The IC2 according to claim 1, wherein said flip-flop latch circuit in said IC2 allows said circuit interrupting device to be reset when a reset confirmed signal is sent to said flip-flop latch circuit.

6. The IC2 according to claim 5, wherein said reset confirmed signal is generated from a simulated current detection feedback circuit when said components in said main circuit function normally; said reset confirmed signal being sent to said flip-flop latch circuit in said IC2.

7. The IC2 according to claim 1, wherein said flip-flop latch circuit transmits said reset confirmed signal to a reset confirmation circuit to allow said circuit interrupting device to be reset when said reset button in said circuit interrupting device is depressed.

8. The IC2 according to claim 7, wherein said reset confirmation circuit comprises a reset start switch (KR4) having a first spring piece and a second spring piece; wherein said first spring piece is connected to a leakage current detection integrated circuit chip (IC1) in said main circuit and said second spring piece is adapted to connect to said IC2; whereby when said reset confirmation circuit receives said reset confirmed signal from said IC2 and said reset button is depressed, said first spring piece and said second spring piece are in a conductive state to allow reset.

9. The IC2 according to claim 6, said IC2 further comprising an inverter circuit; wherein said inverter circuit receives said reset confirmed signal from said simulated current detection feedback circuit when said components in said main circuit function normally and sends said reset confirmed signal to said flip-flop latch circuit.

10. The IC2 according to claim 7, said IC2 further comprising an end-of-service-life test affirmation circuit; wherein said end-of-service-life test affirmation circuit receives said reset confirmed signal from said flip-flop latch circuit and sends said reset confirmed signal to said reset confirmation circuit and optionally to an output status display circuit; said output status display circuit allowing a normal status indicating light to be turned on.

11. The IC2 according to claim 10, wherein said normal status indicating light is a green light-emitting diode.

12. The IC2 according to claim 1, wherein said IC2 further comprising feedback signal input circuit, a start and test input circuit; a backup start and test input circuit; and a backup power supply circuit.

13. The IC2 according to claim 2, wherein when said reset button is depressed, said KR1 is converted from said conductive state into a non-conductive state when said components in said main circuit function normally, which discontinues transmitting of said status signal to said flip-flop latch circuit in said IC2, which further discontinues said output of said status signal to said simulated leakage current generation circuit so that said generation of said simulated leakage current is discontinued.

14. The IC2 according to claim 13, wherein in said non-conductive state, said first spring piece and said second spring piece are separated from each other.

15. The IC2 according to claim 1, wherein said first transistor and said second transistor is replaced with a CMOS integrated circuit transistor compound set.

16. The IC2 according to claim 1, wherein when said at least one of said components in said main circuit does not function normally, no said reset confirmed signal is generated from said simulated current detection feedback circuit, so that no said reset confirmed signal is sent to said flip-flop latch circuit in said IC2 to allow said circuit interrupting device to reset.

17. The IC2 according to claim 1, wherein when at least one of said components in said main circuit does not function normally, said emitter circuit continuously sends said status signal to said simulated leakage current generation circuit which continuously generates said simulated leakage current; wherein said simulated leakage current generation circuit comprises a failure status indicating circuit which contains a failure status indicating light; wherein said failure status indicating light is turned on when said emitter circuit continuously sends said status signal to said simulated leakage current generation circuit.

18. The IC2 according to claim 12, wherein said failure status indicating light is a red or yellow light-emitting diode.

19. The IC2 according to claim 1, wherein said components of said main circuit comprising a differential transformer, a leakage current detection chip (IC1), a silicon control rectifier, and a solenoid coil.

20. The IC2 according to claim 6, wherein said simulated current detection feedback circuit is connected to said main circuit;

wherein when said simulated leakage current is passed through said main circuit and when said components of said main circuit function normally, a differential transformer in said main circuit detects said simulated leakage current and output an electrical imbalance signal to a leakage current detection integrated circuit chip (IC1) in said main circuit, which sends said electrical imbalance signal to a silicon controlled rectifier to turn on and supply power to a solenoid coil in a tripping device to discontinue an electricity continuity of said circuit interrupting device and to allow said reset confirmed signal to be generated in said simulated current detection feedback circuit.

21. The IC2 according to claim 19, wherein said simulated leakage current is further generated by a manual switch coupled to a test button; whereby by depressing said test button, said simulated current detection feedback circuit generates said reset confirmed signal when said components of said main circuit function normally to allow said circuit interrupting device to reset.

22. A set of circuits in a circuit interrupting device capable of automatically performing a check on main components in said circuit interrupting device, said set of circuits comprising:

a main circuit which comprises a differential transformer, a leakage current detection chip (IC1), a silicon controlled rectifier, and a solenoid coil; wherein said main circuit is capable of detecting a leakage current and/or a simulated leakage current; wherein when said leakage current or said simulated leakage current is detected, said main circuit discontinues an electrical continuity of said circuit interrupting device;

a reset status checking circuit which comprises a status test switch (KR1); wherein when KR1 is in a conductive state, said reset status checking circuit generates a status signal to be sent to an end-of-service-life integrated circuit chip (IC2);

an end-of-service-life detection circuit which comprises said IC2; wherein when said main circuit is functioned properly, said IC2 receives a reset confirmed signal from a simulated current detection feedback circuit to allow said circuit interrupting device to be reset; said simulated current detection feedback circuit being adapted to connect to said main circuit and generating said reset confirmed signal when said main circuit functions properly;

a simulated leakage current generation circuit which comprises a leakage current simulation circuit and optionally a failure status indicating circuit; wherein said leakage current simulation circuit recognizes a status signal from said IC2 or a signal from a manual switch coupled to a test button; and wherein when a failure status signal is received by said failure status indicating circuit, a failure status indicating light is turned on; and a reset confirmation circuit which receives said reset confirmed signal from said IC2 when said main circuit functions properly; wherein said reset confirmation circuit comprises a reset start switch (KR4) having a first spring piece and a second spring piece; wherein said first spring piece is connected to said IC1 in said main circuit and said second spring piece is adapted to connect to said IC2; whereby when said reset confirmation circuit receives said reset confirmed signal from said IC2 and said reset button is depressed, said first spring piece and said second spring piece are in a conductive state to allow said circuit interrupting device to be reset.

23. The set of circuits according to claim 22, wherein said set of circuits performs said check on main components in said circuit interrupting device when said circuit interrupting device is powered on and said circuit interrupting device is at a tripped state.

24. The set of circuits according to claim 23, wherein said set of circuits performs said check on main components in said circuit interrupting device without depressing a reset button in said circuit interrupting device.

25. The set of circuits according to claim 22, wherein said main components in said circuit interrupting device comprises said differential transformer, said IC1, said silicon controlled rectifier, said solenoid coil, and said IC2.

26. The set of circuits according to claim 22, wherein at least one of said main components in said circuit interrupting device does not function normally, said circuit interrupting device cannot be reset.

27. The set of circuits according to claim 22, further comprising an output status display circuit; wherein when said main components of said circuit interrupting device function normally, said output status display circuit allowing a normal status indicating light to be turned on.

28. The set of circuits according to claim 27, wherein said normal status indicating light is a green light-emitting diode.

29. The set of circuits according to claim 22, wherein said failure status indicating light generated by said failure status indicating circuit in said simulated current generation circuit is a red or yellow light-emitting diode.

30. The set of circuits according to claim 22, wherein said circuit interrupting device is a ground fault circuit interrupter (GFCI), an arc fault circuit interrupter (AFCI), an immersion detection circuit interrupter, an appliance leakage circuit interrupter, or a circuit breaker.

* * * * *